United States Patent
Bose et al.

(10) Patent No.: US 12,242,890 B2
(45) Date of Patent: Mar. 4, 2025

(54) ROBOTIC PROCESS AUTOMATION SYSTEM AND METHOD

(71) Applicant: Automat, Inc., San Francisco, CA (US)

(72) Inventors: Gautam Bose, San Francisco, CA (US); Lucas Ochoa, San Francisco, CA (US)

(73) Assignee: Automat, Inc., San Francisco, CA (US)

(*) Notice: Subject to any disclaimer, the term of this patent is extended or adjusted under 35 U.S.C. 154(b) by 0 days.

(21) Appl. No.: 18/626,781

(22) Filed: Apr. 4, 2024

(65) Prior Publication Data
US 2024/0338248 A1    Oct. 10, 2024

Related U.S. Application Data

(60) Provisional application No. 63/494,091, filed on Apr. 4, 2023, provisional application No. 63/536,987, filed on Sep. 7, 2023.

(51) Int. Cl.
G06F 9/48    (2006.01)
G06F 9/451   (2018.01)

(52) U.S. Cl.
CPC .......... *G06F 9/4881* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 2020/0272282 A1 | 8/2020 | Nychis et al. | |
| 2020/0326999 A1 | 10/2020 | Frech et al. | |
| 2022/0097228 A1* | 3/2022 | Schaefer | G06V 30/414 |
| 2022/0147386 A1 | 5/2022 | Goyal et al. | |
| 2023/0125807 A1* | 4/2023 | Ripa | G06F 9/451 |
| | | | 715/771 |

OTHER PUBLICATIONS

"What is robotic process automation (RPA)?", Internet Archive Wayback Machine, Feb. 20, 2023, web.archive.org/web/20230220145937/https://www.ibm.com/topics/rpa.
Deng, Xiang, et al., "MIND2WEB: Towards a Generalist Agent for the Web", arXiv:2306.06070v2 [cs.CL] Jun. 15, 2023, arxiv.org/pdf/2306.06070v2.
Furuta, Hiroki, et al., "Multimodal Web Navigation with Instruction-Finetuned Foundation Models", arXiv:2305.11854v4 [cs.LG] Feb. 25, 2024, arxiv.org/html/2305.11854v4.
Guan, Yachu, et al., "Intelligent Virtual Assistants with LLM-based Process Automation", arXiv:2312.06677v1 [cs.LG] Dec. 4, 2023, arxiv.org/html/2312.06677v1.
(Continued)

*Primary Examiner* — Eric C Wai
(74) *Attorney, Agent, or Firm* — Jeffrey Schox; Diana Lin

(57) ABSTRACT

In variants, a method for robotic process automation (RPA) includes: receiving an automation request; optionally determining an application representation of an application associated with the automation request; generating a set of tasks based on the automation request; optionally classifying each task in the set of tasks; generating a set of instructions for each task in the set of tasks; optionally validating the set of instructions; and optionally executing the set of instructions cooperatively forming an RPA bot.

18 Claims, 19 Drawing Sheets

(56) References Cited

OTHER PUBLICATIONS

Wei, Jason, et al., "Chain-of-Thought Prompting Elicits Reasoning in Large Language Models", 36th Conference on Neural Information Processing Systems (NeurIPS 2022), arXiv:2201.11903v6 [cs.CL] Jan. 10, 2023, arxiv.org/pdf/2201.11903.

Zhang, Xiaoyi, et al., "Screen Recognition: Creating Accessibility Metadata for Mobile Applications from Pixels", CHI '21, May 8-13, 2021, Yokohama, Japan, arXiv:2101.04893v1 [cs.HC] Jan. 13, 2021, arxiv.org/pdf/2101.04893.

* cited by examiner

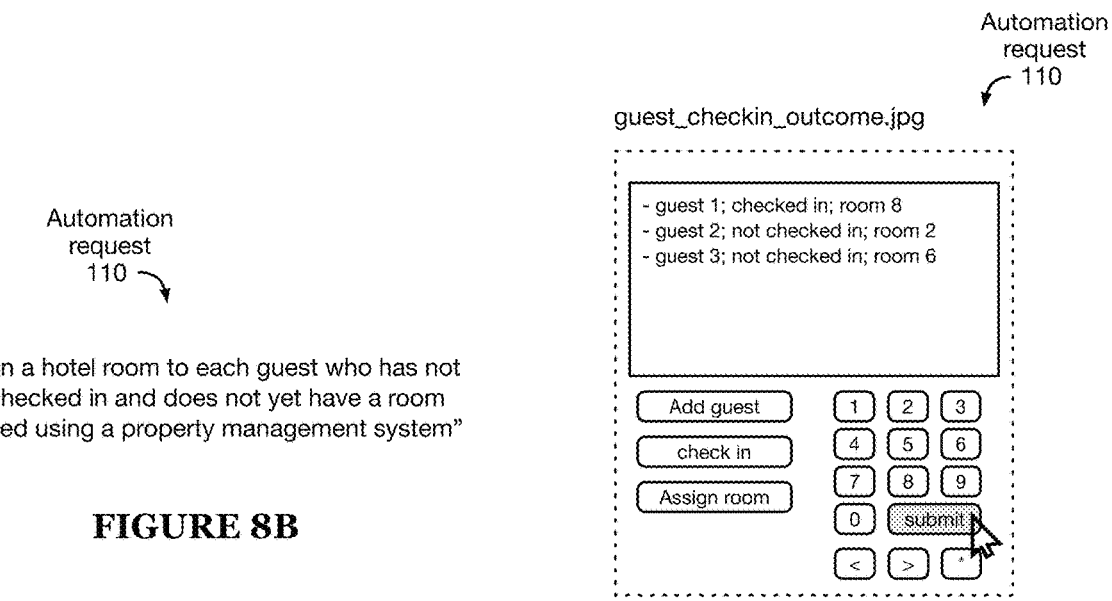
FIGURE 8B
FIGURE 8C
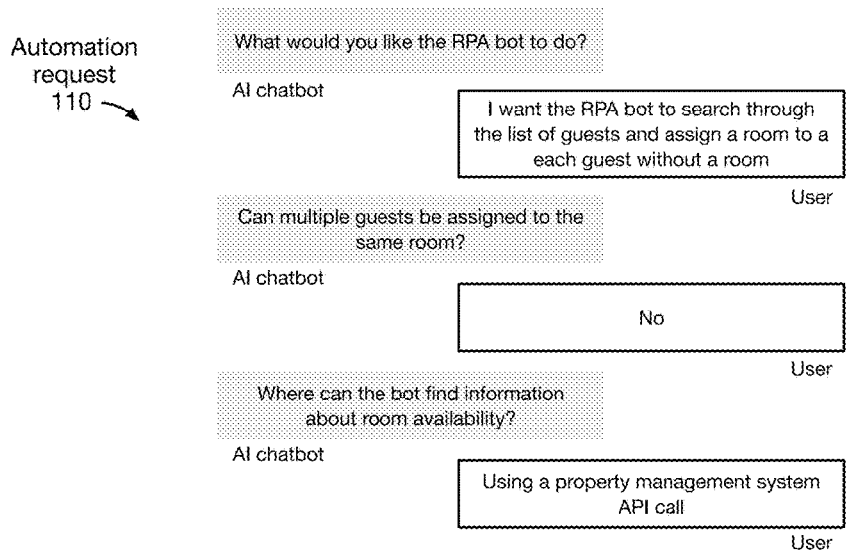
FIGURE 8D

ROBOTIC PROCESS AUTOMATION SYSTEM AND METHOD

CROSS-REFERENCE TO RELATED APPLICATIONS

This application claims the benefit of U.S. Provisional Application No. 63/536,987 filed 7 Sep. 2023, and U.S. Provisional Application No. 63/494,091, filed 4 Apr. 2023, which are each incorporated in its entirety by this reference.

TECHNICAL FIELD

This invention relates generally to the robotic process automation (RPA) field, and more specifically to a new and useful RPA method in the robotic process automation field.

BACKGROUND

Robotic process automation (RPA) is a technology that automates repetitive manual tasks. While RPA is in high demand, RPA has not been widely adopted because conventional methods of creating RPA bots are extremely difficult, time intensive, and expensive to implement. In particular, conventionally, generating an RPA bot requires: deep understanding of the business process being automated, the ability to identify and extract data from unstructured sources, and deep understanding of the application and interactions being automated.

Furthermore, the programmatic actions executed by the RPA bot are not direct analogs or direct automations of the manual process. For example, for a task that involves scrolling to the bottom of the webpage and clicking a button, the RPA bot does not replicate the manual task of actuating the mouse to accomplish the task; instead, the RPA bot programmatically scrolls through the frames of a webpage and clicks on the location of where the button should be (e.g., without a priori knowledge of whether the button is actually located at the location).

For these reasons, RPA bots have conventionally been manually coded, and lack semantic, natural language descriptors for the code.

Furthermore, RPA bots are incredibly difficult to maintain. Since each RPA bot is programmed specifically for— and is therefore highly dependent on—the layout of the application's interface, any interface change or application update will cause the RPA bot to fail, which requires a new RPA bot to be manually created. Additionally, because each RPA bot is manually coded for the specific task, conventional RPA bots are effectively atomic—a small change in one step of the task workflow requires a complete rewrite of conventional RPA bots.

Thus, there is a need in the robotic process automation field to create a new and useful system and method for automatically generating RPA bots.

BRIEF DESCRIPTION OF THE FIGURES

FIGS. 8A-8D are illustrative examples of variants of automation requests.

DETAILED DESCRIPTION

The following description of the embodiments of the invention is not intended to limit the invention to these embodiments, but rather to enable any person skilled in the art to make and use this invention.

1. Overview

Figure 1:
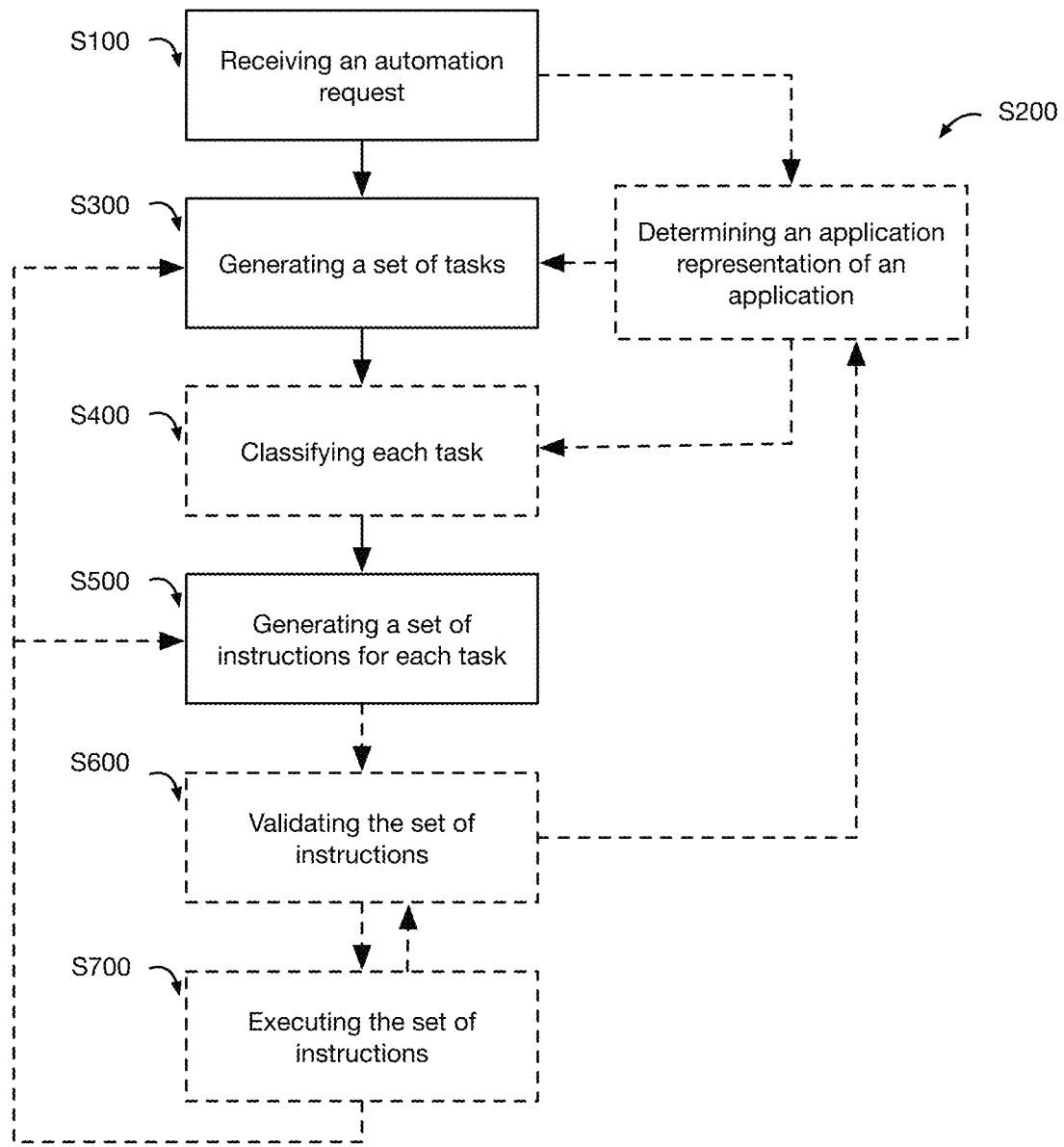
FIG. 1 is a schematic representation of a variant of the method.

In variants, as shown in FIG. 1, a method for robotic process automation (RPA) includes: receiving an automation request S100; optionally determining an application representation of an application associated with the automation request S200; generating a set of tasks based on the automation request S300; optionally classifying each task in the set of tasks S400; generating a set of instructions for each task in the set of tasks S500; optionally validating the set of instructions S600; and optionally executing the set of instructions S700. The method functions to automatically create a robotic process automation (RPA) bot with no or minimal human intervention. In variants, the method functions to create a human-readable, natural language task list and an RPA bot cooperatively formed from code for each task in the task list.

Figure 2:
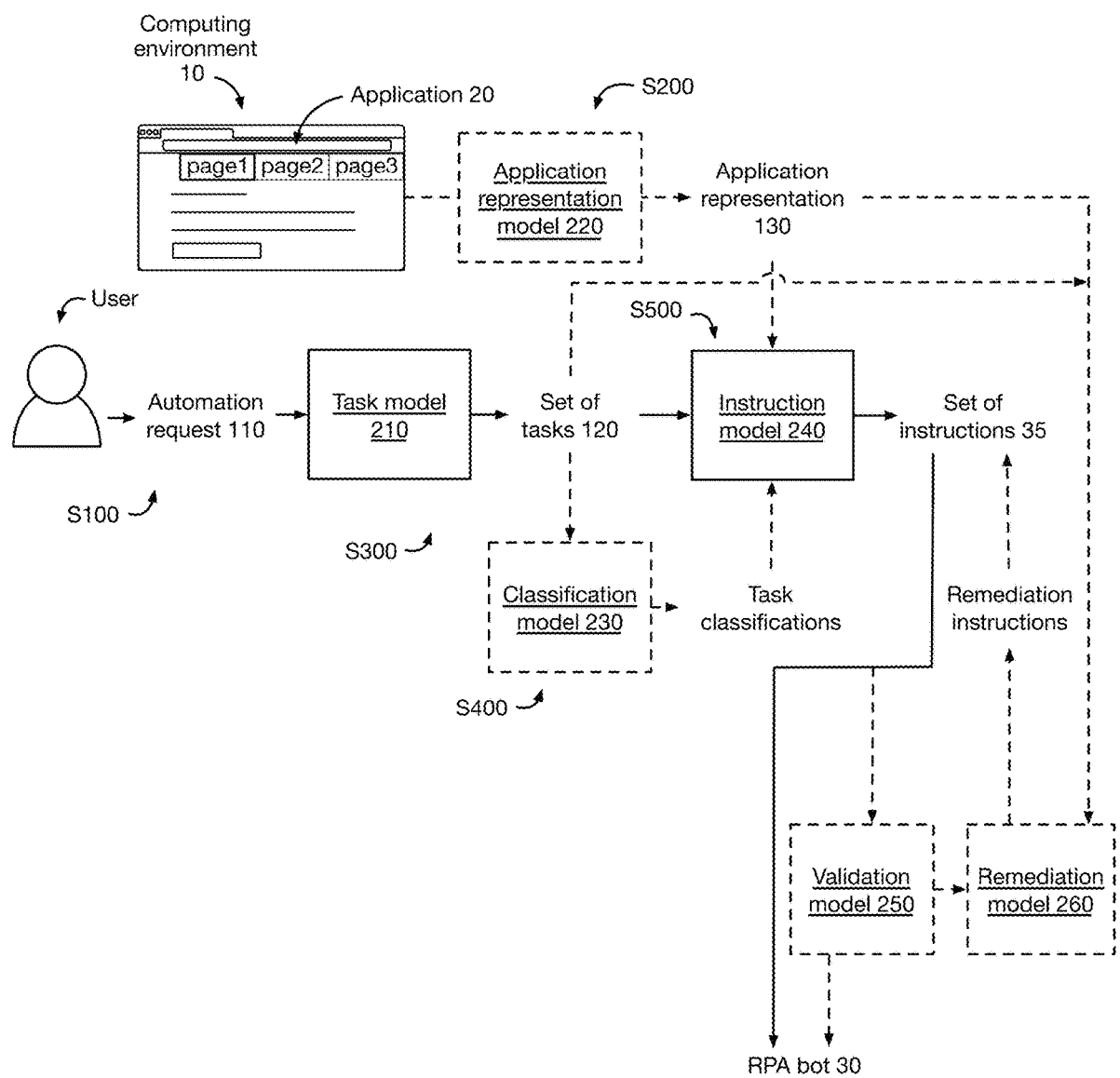
FIG. 2 is a schematic representation of a variant of the system.

In variants, as shown in FIG. 2, the system can include a task model 210, an optional application representation model 220, an optional classification model 230, an instruction model 240, an optional validation model 250, an optional remediation model 260, and/or any other suitable system components.

In examples, a method for automatically generating an RPA bot 30 that automates a workflow for interacting with a set of applications can include: generating a sequence of human-readable tasks 120 based on an automation request 110 (e.g., using a first machine learning "task" model), and generating a set of instructions 35 (e.g., a code snippet or set thereof) for each task (e.g., using a second machine learning "instruction" model), based on an application representation 130 (e.g., a document object model, a screenshot or video depicting the application, a set of interaction element segments or locations extracted from screenshots or video frames, etc.) for each of the set of applications. An example is shown in FIG. 2. The resultant sequence of instruction sets 35 can cooperatively form the RPA bot that performs the desired workflow using the application.

In an illustrative example (e.g., example shown in FIGS. 7A-7D), the method can include: receiving an automation request 110 (e.g., a text query, a demonstration, a video, etc.); generating a set of tasks 120 based on the automation request, using a primed or finetuned LLM or MLM (e.g., a task model 210); determining a set of instructions 35 for each task 120 and selecting application interaction elements (e.g., webpage interaction elements) for each task from an application representation (e.g., DOM) using a second primed or finetuned LLM or MLM (e.g., an instruction model 240); generating a set of instructions (e.g., code snippet) for each task 120, based on the respective action and selected webpage interaction element; and executing the resultant sets of instructions (e.g., defining the RPA bot).

In a second illustrative example, the method can include: receiving an automation request 110 including a visualization of the workflow (e.g., screenshots, video, etc.); generating a set of tasks 120 based on the automation request, wherein the set of tasks can include an action and a target element from the visualization (e.g., a semantic descriptor of the target interaction element for the task, a visual segment of the target interaction element, etc.); determining an application representation for the application (e.g., set of semantic segments representing interaction elements of the application, a set of coordinate locations of interaction elements of the application, etc.); and determining a set of instructions 35 (e.g., code snippets) for each task 120 based on: the action, the target element, the application representation, and optionally a prior task and/or an application state after prior task completion (e.g., determined by executing or simulating prior task execution on the application).

In the second illustrative example, the method can optionally include executing the resultant set of instruction sets (e.g., the RPA bot). The method can optionally include detecting instruction set failure (e.g., task failure) and remediating the RPA bot. In examples, remediating the RPA bot can include: determining an updated application representation for the runtime application (e.g., by sampling a video or screenshot of the application and determining an updated application representation using the application representation model 220); attempting a remediation option from an ordered list of remediation option; reattempting instruction set execution (e.g., reattempting the task); and adding the remediation option (e.g., the remediation instructions, the remediation code set) to the RPA bot if task execution was successful (e.g., before the task's instruction set; after the task's instruction set along with a second instance of the task's instruction set; etc.), and repeating the remediation process (e.g., reattempting remediation and task execution with the next remediation action in the list or by repeating the entire remediation process) if the task execution was unsuccessful.

However, the system and method can be otherwise defined.

2. Technical Advantages

Variants of the technology can confer one or more advantages over conventional technologies.

First, variants of the technology can improve the robotic process automation field by automatically generating an RPA bot that automates an interaction with a set of applications (e.g., client applications. For example, the technology can automatically (e.g., zero-shot, no human intervention, etc.) convert an automation request into a set of executable instructions (e.g., code snippets), as an affordance function, using a set of trained machine learning models (e.g., large language models (LLM), visual language models (VLM), multimodal language models (MLM), etc.). In other examples, the technology can automatically obtain a deep understanding of the applications by parsing the application (e.g., using a browser plugin) and identifying selectors on the underlying application (e.g., HTML), when generating the instructions. This can be more robust to application updates, since the Second, variants of the technology can improve the robotic process automation field by making the resultant robotic process automation more accurate. For example, the technology can generate an intermediary set of ordered tasks (e.g., human-readable tasks) based on the automation request 110, wherein the set of instructions 35 are subsequently generated based on both the set of tasks 120 and a representation of the current version of the application 20. This can reduce programming errors by enabling a user to review the intermediary set of tasks 120 in a human-readable, natural language format instead of parsing code. This, in turn, can enable the resultant RPA bot to be more accurate (e.g., by reducing the error due to inaccurate task inclusion). This can also enable the RPA bots 30 to be more easily maintained. For example, when a task in the set of tasks changes, the code for the task can simply be regenerated and merged with the set of instructions (e.g., code snippets) for the other tasks; the entire RPA bot 30 does not need to be regenerated. In another example, when the application 20 is updated, the set of instructions 35 can simply be regenerated using the set of tasks and the new version of the application 20. This can save on computational costs, and can also reduce programming errors (e.g., since users can simply review the set of tasks instead of programming a de novo version of the RPA bot 30 for the new application version). This can also reduce computational resource consumption since the resultant RPA bot does not need to be as comprehensively validated. This can also enable the technology to be more scalable. For example, the same set of tasks 120 can be used to generate RPA code for other applications that serve the same functionality as the original application 20.

Third, variants of the technology can also improve RPA bot maintenance and performance by determining application representations 130 and the set of tasks 120 from the same input, instead of requiring different inputs. For example, the technology can extract a semantic segment, semantic identifier, feature vector (e.g., embedding), and/or other element representations for the elements that the tasks 120 are acting upon from the automation request. These element representations can enable the technology to automatically identify the correct application elements (e.g., UI elements) to interact with in the application representation 130 and/or during runtime (e.g., in real-time, without human intervention), even if the UI elements have moved (e.g., using the semantic segment or feature vector) or changed (e.g., using the semantic identifier). Variants using feature vectors to identify application elements can also reduce computational costs by only using a subset of the neural network layers (e.g., only using the encoder, without using the decoder, etc.).

Fourth, variants of the technology can automatically fix failed RPA bots 30, optionally without a priori knowledge of an application 20. In examples, the technology can iterate through a list of remediations with interim task retries until the task is completed. This can confer the additional benefit of being able to remediate the RPA bot failure in real-time (e.g., during runtime), and can also minimize adverse effects on a user's application functionality (e.g., minimizes the chance of accidentally performing an unintended task).

Fifth, variants of the technology can increase accuracy by splitting task determination and instruction (e.g., code) generation. The inventors have discovered that, in variants, models can be trained to accurately generate semantic tasks 120 given an abstract prompt or be trained to accurately generate code given a concrete task, but not both. This split can enable the technology to both accurately generate a set of tasks 120 and code for said set of tasks. However, in other variants, a model can be trained to directly generate accurate code given an abstract prompt. (e.g., by training a model using the abstract prompt as a training input and the code that is output by the split model architecture as a training target).

Sixth, variants of the technology can enable a user to perform the same automation request 110 in different applications. The technology can use the same intermediary set of ordered tasks 120 for different applications 20 or can generate a new set of ordered tasks 120 for a new application 20. This can enable the technology to seamlessly switch between different comparable applications (e.g., switch from Excel to Pages) if an application is unavailable. This can keep complex systems online, even when individual system components fail.

However, further advantages can be provided by the system and method disclosed herein.

3. System

The system can function to facilitate generation of an RPA bot 30 based on an automation request 110. As shown in FIG. 2, in variants, the system can include a computing environment 10 running a set of applications 20, a robotic process automation (RPA) bot 30, a set of instructions 35, a set of inputs (e.g., an automation request 110, a task 120, an application representation 130, including an optional set of element representations, etc.), a set of models, and/or other components. The set of models can include one or more: task models 210, application representation models 220, optional classification models 230, instruction models 240, validation models 250, optional remediation models 260, and/or any other suitable models.

The computing environment 10 can function to host or execute one or more applications 20. The computing environment 10 can optionally host or execute one or more RPA bots 30, daemons (e.g., running the RPA bot), and/or other modules. In examples, a user can demonstrate an example of the desired workflow in the computing environment, and/or the RPA bot 30 can control execution of the set of applications executing in the computing environment (e.g., to emulate the desired workflow). The computing environment 10 can be a computing device, operating system, desktop instance, cloud computing environment, container, virtual machine, and/or any other suitable computing environment 10. The computing environment 10 can run the set of applications 20 which the RPA bot 30 interacts with, can be an application, can be a remote interface for the set of applications, and/or can be otherwise related to the application set. The computing environment 10 is preferably on the client side (e.g., user side) of the instruction generation process (e.g., S500), but can additionally or alternatively be on the platform side of the instruction generation process. In a variant, the RPA bot 30 runs within the client's computing environment 10. In a second variant, the RPA bot 30 runs on a remote device (e.g., a cloud system) and remotes into the client's computing environment 10 (e.g., using secure shell (SSH), remote desktop protocol (RDP), virtual network computing (VNC), web-based remote desktop solutions, etc.). However, the RPA bot 30 can run on any other suitable device. The computing environment 10 can be on a PC, workstation, set of servers, and/or any suitable type of computing device. In variants, the computing environment 10 can include a computing environment interface which hosts multiple application interfaces (e.g., a desktop environment). However, the computing environment 10 can be otherwise configured.

The applications 20 can function to perform specific tasks 120 and/or functions for end users. The applications 20 can include software, client apps, and/or any other suitable type of application. Examples of applications 20 include web applications (e.g., HTML applications, JAVA applications, etc.), desktop/mobile applications, cloud applications, embedded applications, a hardware controller, an extended reality application (e.g., a VR application, AR application, etc.), and/or other applications. Each workflow (and the associated RPA bot 30) can interact with one or more applications. In the latter variant, the multiple applications preferably execute in the same computing environment 10, but can additionally or alternatively execute in different computing environments 10.

Each application 20 can include an interface, but can alternatively include no interface. The interface can include a GUI, text-based user interface, command line interface, web service interface, application programming interface, and/or any other suitable type of interface. The interface can be configured to receive programmatic inputs or no programmatic inputs. The interface can include interactable interaction elements (e.g., buttons, text boxes, selectable calendars, drag-and-drop features, webhooks, API endpoints, etc.) and/or non-interactable elements (e.g., text boxes, images, blank space, etc.). The elements (e.g., interaction elements and non-interactable elements) can be visible (e.g., displayed on a GUI) or hidden. The interface can include one or more windows and/or pages. The interface can be nested within other applications 20 but can alternatively not be nested within other applications 20. The interface can be opened and/or closed responsive to code, a user interaction, RPA interaction, and/or any suitable instructions 35. The underlying code of the interface can be accessible (e.g., by accessing a page source, inspecting the page elements), or inaccessible (e.g., proprietary, no call or menu to access the code, etc.). The interface can be fully operable through RPA but can alternatively be partially operable through RPA. However, the interface can be otherwise configured.

The RPA bot can function to automate tasks 120 by interacting with a set of applications within a computing environment 10. The RPA bot 30 (e.g., RPA client, RPA application, RPA module, RPA robot, etc.) can run within the computing environment 10, can run remote from the computing environment 10 and remote in to the computing environment 10, or can otherwise interact with the computing environment 10. The RPA bot 30 can: call an application's interaction elements (e.g., perform API calls), set values or change the state of an application's interaction elements, act upon a predetermined coordinate position (e.g., x,y position, x,y,z position, x,y,z and rotational position, etc.) within the application or computing environment 10, and/or otherwise interact with the application. The RPA bot 30 can be attended or unattended. The RPA bot 30 can be a rule-based bot, cognitive RPA bot 30 (e.g., can leverage machine learning for some or all tasks 120), and/or any other suitable type of RPA bot 30. The RPA bot 30 can interact with remote systems (e.g., remote from the computing environment 10), can interact only with local systems and/or applications 20, and/or interact with any other suitable set of applications. The RPA bot 30 can interact with GUIs, interact with the GUI code, with the application backend, and/or interact with any other suitable portion of an application. In an example, an RPA bot 30 can interact with an application 20 by setting a value of a programmatic element (e.g., an HTML element). In a second example, an RPA bot 30 can interact with a position within an application's interface (e.g., an x,y position, an x,y,z position, etc.). However, the RPA bot 30 can otherwise interact with an application 20. The RPA bot 30 can run within one computing environment 10 but can alternatively switch between computing environments 10. The RPA bot 30 can optionally detect errors (e.g., detect when the computing environment 10 does not include an element for the next task 120, detect when the task associated with the instruction set was not accomplished, detect a constraint was reached, determine that an error was thrown after task instruction execution, determine that the application interface changed, etc.) but can alternatively operate without detecting errors. The RPA bot 30 can optionally initiate redetermination of tasks 120, redetermination of instruction sets 35, reclassification of tasks 120, revalidation of a set of instructions 35, and/or any other suitable self-debugging step; alternatively, the error values, identifier for the failed task, computing environment state, and/or other error information can be passed to the RPA generation platform for updated RPA bot generation. In variants, the system or the RPA bot 30 can try to fix an identified error without redetermining the set of instructions 35 by attempting a remediation action from a set of candidate remediation actions (e.g., closing a modal, restarting an application 20, scrolling, etc.), can fix the identified error by amending the instructions 35 to include remediation instructions (e.g., remediation code) associated with a successful set of remediation actions (e.g., for future iterations of the operation of the application 20), and/or by otherwise fixing the identified error. Alternatively, self-debugging can be out of the RPA bot's control and/or be performed by another module.

The RPA bot 30 can include a set of instructions 35 (e.g., code snippets). Each instruction set 35 is preferably specific to a task in the task list, but can additionally or alternatively be for multiple tasks in the task list. The set of instructions 35 can be ordered in task order, ordered out of task order, or can be disordered. The RPA bot 30 can initiate determination of instructions 35 but can alternatively not initiate determination of instructions 35.

The set of instructions 35 (e.g., RPA instructions) can function to control the RPA bot 30. The set of instructions 35 can include code snippets, a quantitative objective, a set of constraints, a set of security credentials, commands, a set of coordinates, a description of actions, references to other RPA bots 30, and/or any other suitable type of instruction. The set of instructions 35 can also be associated with a task identifier (e.g., for the corresponding task in the task list). In a first variant, the set of instructions 35 includes code. Code can be in a general scripting language (python, JavaScript, VBScript, HTML), an RPA domain-specific language (Automation Anywhere Scripting Language, etc.), and/or any other suitable scripting language or combination of scripting languages. Code can additionally include application interactions, API calls, function calls, and/or any other suitable type of coded interaction (e.g., programmatic interaction) with the computing interface and/or application 20. In a second variant, the set of instructions 35 includes coordinates (e.g., mouse/tap location commands). Coordinates can be in the reference frame of the computing environment 10 (e.g., a desktop), the application 20, (e.g., an application window, browser window, model, etc.), in a 3D real-world reference frame (e.g., relative to an origin point on or off an AR/VR headset), in a 3D virtual world reference frame, and/or any other suitable reference frame. Coordinates can be a single coordinate and/or a range of coordinates (e.g., collectively spanning a task-correlated element). In a third variant, the set of instructions 35 includes security credentials. Security credentials can be automatically generated to: enable the RPA bot 30 to call particular API calls, access computing environment functionality, and/or any other action within the application 20 and/or computing environment 10. In a fourth variant, the set of instructions 35 can include actions. Actions can be an interaction with the computing environment 10, applications 20, and/or another system component. Examples of interactions include "click( )" "dblclick( )" "scroll( )" "fill( )" "check( )" "selectOption( )" "hover( )" and/or any other suitable interaction. Interactions can include action values (e.g., "scroll distance," "input text," "file path input," etc.), parameters, and/or other types of values. Actions can be embodied in code and/or any other suitable form. However, instructions 35 can take any other suitable form.

The set of instructions 35 can be ordered or unordered. The instructions within the set of instructions 35 can be in the same or different order as the corresponding tasks 120 (e.g., the tasks 120 used to generate the set of instructions 35, the tasks 120 that each instruction set 35 corresponds to, etc.). The set of instructions 35 can be determined using an instruction model 240, a remediation model 260, a validation model 250, and/or any other suitable system component. The set of instructions 35 can be determined automatically or manually. The set of instructions 35 can collectively form the RPA bot 30 and/or part of the RPA bot 30. However, the set of instructions 35 can be otherwise defined.

The automation request 110 functions to describe a desired workflow (e.g., procedure) for an RPA bot 30. The workflow preferably includes a series of manual interactions (e.g., user workflows, user interactions, etc.) with the set of applications (e.g., in the one or more computing environments 10), but can additionally or alternatively include automatic interactions with the application set, include a series of mechanical interactions with a set of devices, and/or be otherwise defined. The automation request 110 can include an interaction description, describing or representing a user interaction with a set of applications. The interaction description can include: a walkthrough of the procedure, a description of high-level goals (e.g., a "user goal" for the procedure), a list of procedure steps, a set questions and respective responses from a questionnaire (e.g., from a conversation with a chatbot, etc.), and/or any other suitable form of information. The automation request 110 can include and/or be an encoding of another automation request 110. The automation request 110 can be determined manually, automatically, and/or can be otherwise determined. In a first example of automatic the automation request 110 generation, a workflow is automatically captured and/or recorded when the workflow is performed a threshold number of times. In a second example of automatic the automation request 110 generation, a user can instruct a local client to record the user's application, desktop, or other window during user performance of the interaction. However, the automation request 110 can be otherwise generated.

Figure 8A:
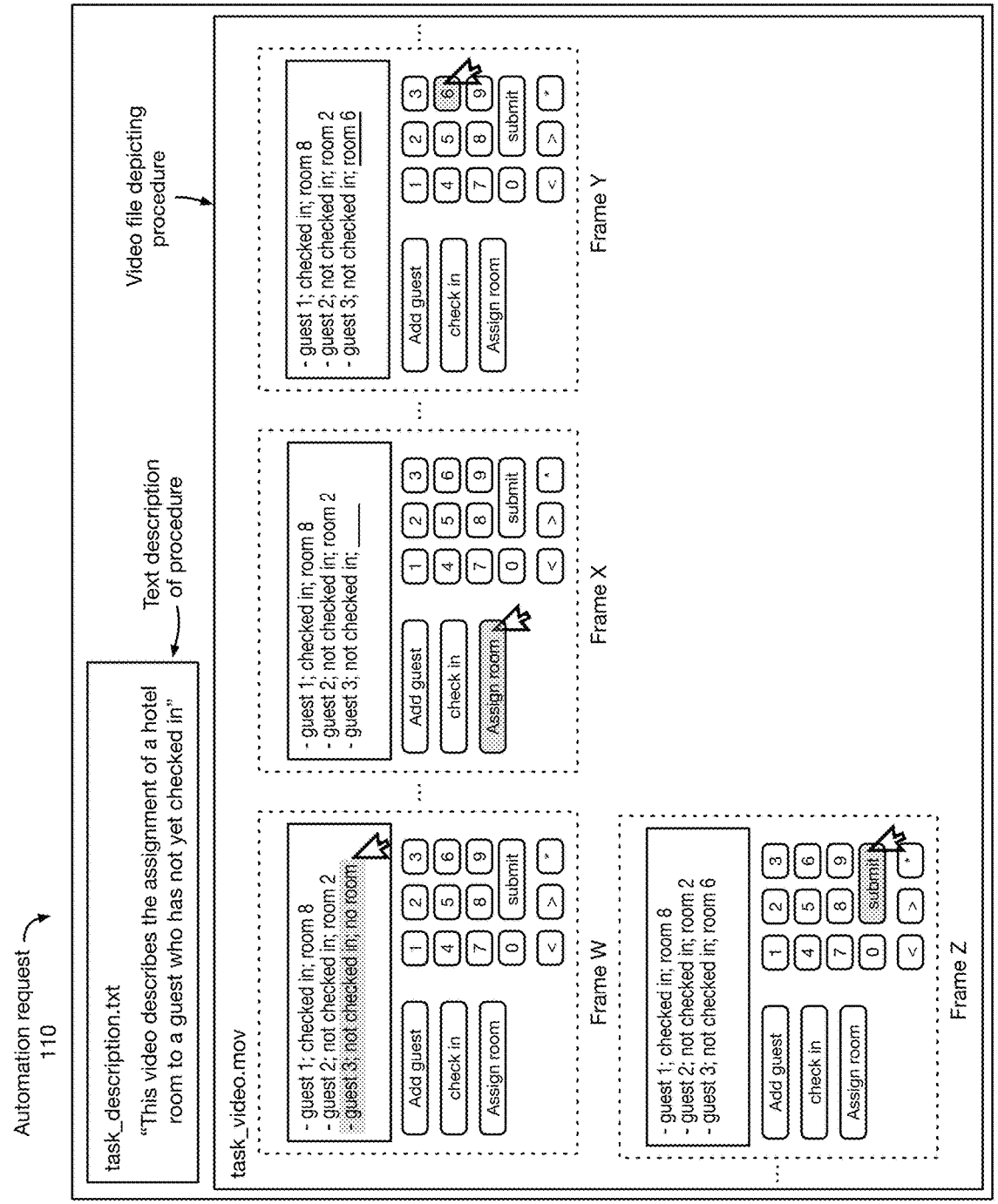
Figure 11A:
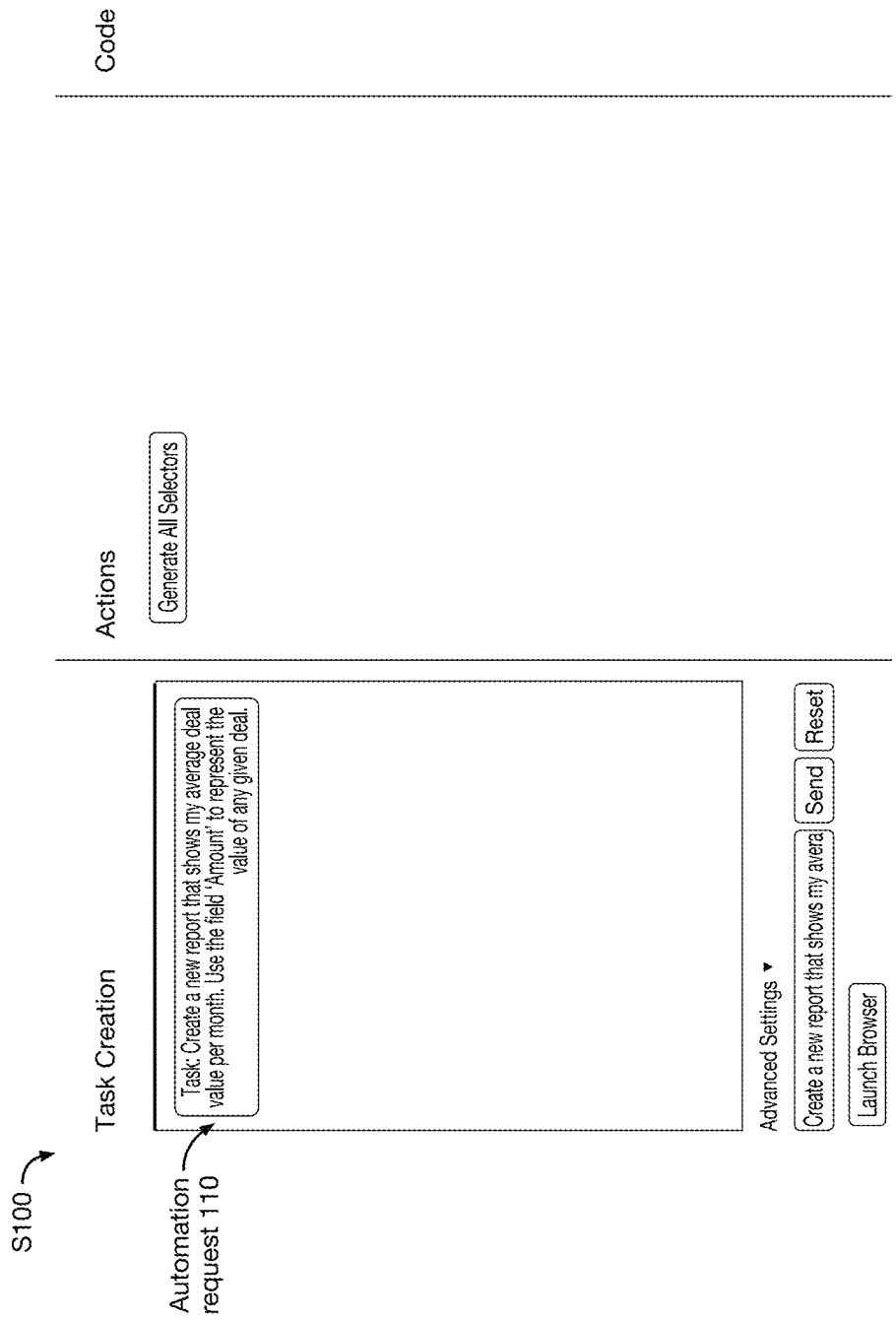
FIGS. 11A-11D are an illustrative example of: receiving an automation request, generating a set of tasks for the request, generating a set of instructions based on the set of tasks, and executing the instructions, respectively.

The automation request 110 can include text, audio, video, still frames, user motion, cursor motion, screen tracks, user input logs (e.g., keystroke logs, mouse motion, mouse clicks, etc.), and/or any other suitable data type. Examples of automation requests 110 can include a video walkthrough (e.g., a screen recording or a video captured by a camera filming a screen; example shown in FIG. 8A) with or without a voiceover, a set of frames (e.g., a set of still frames or screen captures, a video or screen recording, etc.)

depicting the computing environment and/or application set 20, text describing the steps of the process, text describing the high-level goal of the process (e.g., a text query; example shown in FIG. 8B), a starting application state and/or a target application interface state (e.g., example shown in FIG. 8C), chatbot and/or questionnaire responses (e.g., including or not including respective questions; example shown in FIG. 8D), a voice memo (e.g., supplementing the video walkthrough or alone, etc.), a single example of the above (e.g., without other variants), a combination of any of the examples of aforementioned automation requests 110, and/or any other suitable automation request. In a first specific example, the automation request 110 includes a high level goal, such as a text description of the end state "set up a new workstation for a new employee" or an image of a target application interface state. An example is shown in FIG. 11A. In a second specific example, the automation request 110 includes a list of procedure steps (e.g., "open application 1 by double-clicking on the application 1 icon; click the "add user" button on the upper right of the landing page, click the "username" box on the add user page, retrieve a username for the user from the database, and enter the retrieved username into the username box," etc.). In a third specific example, the automation request 110 includes a screen recording of a user performing the desired procedure. However, the automation request 110 can be otherwise constructed.

The system can create and be used with a set of tasks 120. Each workflow can be associated with one or more task sets. Each task set is preferably associated with a single workflow, but can additionally or alternatively be associated with multiple workflows. Each task set is preferably associated with a single set of applications, but can additionally or alternatively be associated with multiple application sets. Each task 120 can represent a step of the workflow described by the automation request 110. The steps are preferably the critical actions or tasks that must be completed to achieve the workflow, but can additionally or alternatively include target application states or be otherwise defined. The task 120 can be human-readable or not human readable (e.g., an encoding). The task 120 is preferably in natural language (e.g., a layperson description, a semantic description of the task 120, etc.), but the task 120 can alternately be in a formal language (e.g., code, an encoding, an embedding, etc.). The task 120 can be determined by the task model 210 be determined by the user, or be determined any other system component. The task 120 is preferably not based on the layout of a particular application 20 (e.g., the application representation 130; is application agnostic; etc.), application version, or computing environment 10; alternatively the task 120 can be based on a specific application 20, application version, computing environment 10, and/or otherwise specific or generic. The task 120 is preferably persistent through multiple iterations of the method but can alternatively be replaced by an updated task 120 (e.g., in step S300). The task can be associated with a task class or task type (e.g., determined by classification model 230), but can additionally or alternatively be associated with any other suitable set of parameters.

Figure 3:
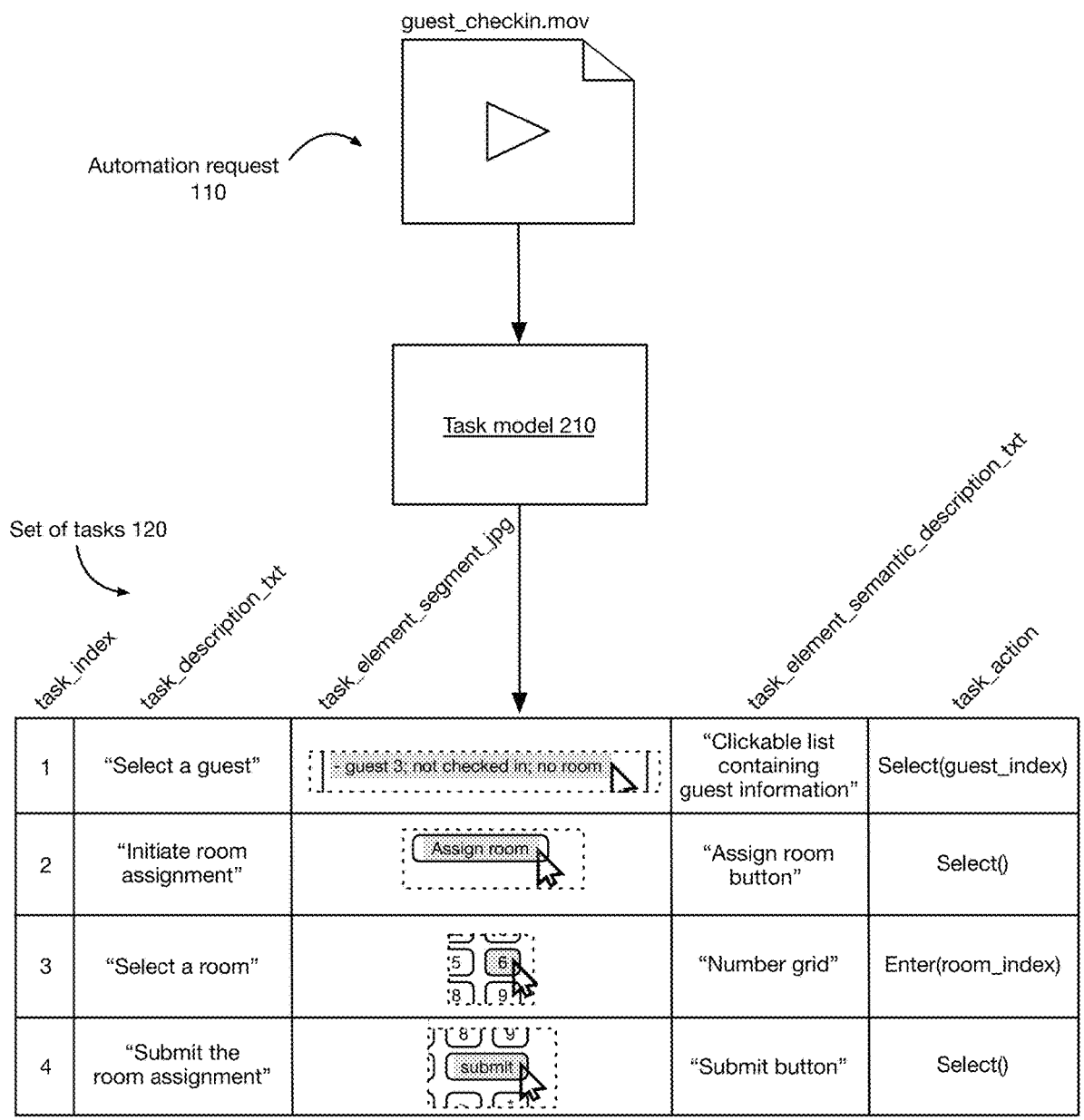
FIG. 3 is a schematic representation of a variant of determining a set of tasks 120.

In a first variant, a task 120 includes text describing an instruction (e.g., "create a blank user profile"). In a second variant, a task 120 includes a task action and a task element (e.g., example shown in FIG. 3). The task element can be a reference (e.g., a descriptor, an index, a title, image segment, etc.) to the interaction element. Examples of task elements include an element representation, a semantic descriptor of the element (e.g., "start button") and/or element representation, a segment of the automation request 110 material (e.g., a segment of a frame of a video, an image segment of the application interface, etc.), an encoding (e.g., of the element appearance), a semantic segment (e.g., visual segment associated with a semantic label), a bounding box (e.g., associated with a semantic label and coordinate location, determined by an object detector, etc.), and/or any other suitable types of task elements. The task element can be identified and/or determined based on the application representation 130, task 120, current set of instructions 35, and/or any other suitable system component. A task action can describe what to do with the element (e.g., click, drag, input value, delete information, hover, etc.). Examples of action parameters can include: duration, valence (e.g., up, down, left, right, etc.), distance (e.g., in pixels, in frames, in windows, etc.; etc.), location (e.g., coordinates), text values, and/or other parameters. The action parameters can be in the application coordinate frame, in the computing environment coordinate frame, etc.). However, the task 120 can be represented in any other suitable way.

A task 120 can optionally include a set of dependencies. Examples of dependencies can include: a prior task (e.g., wherein the tasks are part of an ordered list), an application state, and/or any other suitable dependency. The task 120 can optionally additionally include a trigger (e.g., a condition that needs to be met before the task 120 is performed). Examples of triggers include completion of a prior task 120, a trigger application state (e.g., an expected start state, a specific notification and/or output generated by the application 20), and/or any other suitable trigger. Examples of tasks 120 include switching between application windows, selecting a button, entering text into an input box, checking to see if an email inbox unread email count has increased, but tasks 120 can be any other suitable task 120.

However, each task 120 can be otherwise configured.

The application representation 130 can function to represent the elements of the applications 20 and/or computing environment 10. The application representation 130 can additionally or alternatively represent the layout, hierarchy, content, application structure, attributes, and/or other suitable component of the application. Elements can be document objects, data objects, interaction elements (e.g., clickable elements, scrollable elements, selectable elements, data entry elements, i-frames, input elements, etc.), display elements (displayed text, images, video, etc.), structural elements, form elements, navigation elements, content elements, feedback elements, and/or other elements. Examples of interaction elements can include: UI elements (e.g., text fields, buttons, checkboxes, radio buttons, sliders, switches, etc.), other frontend elements, backend elements, links, endpoints, webhooks, and/or other interaction elements. Elements can be represented as element representations within the application representation 130 and/or in any other form. Element representations can include: a semantic descriptor, coordinate set, embedding (e.g., of the semantic description of the element, of the element appearance, etc.), visual segment, and/or any other suitable representation. The application representation 130 can represent the entire application 20, represent a single frame, and/or represent any other suitable portion of the application. The application representation 130 is can be a stateless representation (e.g., independent of application attribute values). In an example, the application representation 130 can include a document object model (DOM). Alternatively, the application representation 130 can represent a single application state or set thereof (e.g., a stateful representation; dependent on application attribute values). For example, the application representation 130 can be a framework for a stateful representation (e.g., include application element parameters that can take on different values with different application states), be a stateful representation, and/or otherwise represent the application. In an example, the application representation 130 can include element representations extracted from a screenshot of an application 20.

The application representation 130 preferably represents a single application 20 but can alternatively represent multiple applications 20 (e.g., a desktop containing multiple applications 20).

The system can use one application representation 130 or multiple application representations 130. The application representations 130 are preferably unrelated to the task list, but can additionally or alternatively be associated with the task list. In a first example, one application representation 130 is used for all tasks 120 (e.g., in a task list, in the system, etc.). In a second example, a different application representation 130 is used for each task 120 (e.g., in the task list, in the system, etc.). In a third example, one application representation 130 is used for each task classification. In a fourth example, one application representation 130 is used for each application within the computing environment 10, wherein the tasks interacting with a given application are all associated with the same application representation. However, the application representations 130 can be otherwise determined.

Each application 20 can be represented by one or more application representations 130 (e.g., each including a DOM, AST, etc.). Each application representation 130 can represent a single application 20 or multiple applications 20 (e.g., a merged structure of multiple applications 20, a segmented captured frame depicting a desktop with multiple applications 20, etc.). Each application representation 130 can represent a single application version or multiple application versions. The application representation 130 can include position, semantic information, parameters, dependencies, hierarchies, application elements, element representations, element groups (e.g., a keyboard, a 2D array of buttons numbered 0-9), and/or other suitable types of information. Element representations can include copies of elements, images of elements (e.g., an image segment depicting the element), element indices, element locations (e.g., coordinates), element names, element encodings, element code (e.g., HTML code, etc.), and/or other types of representations of elements. The application representation 130 can additionally represent relationships between elements (e.g., dependencies/hierarchies, relative positions, etc.) but can alternatively not represent relationships between elements. The application representation 130 can take any suitable form. In a first variant, the application representation 130 can include a data object model for a website (e.g., a hierarchical tree structure with each node in the tree representing a different part of the document). The head node can contain information about the document, such as the title, the author, and the keywords. The body node can contain the content of the document, such as text, images, tables, and/or other forms of content. The element nodes can represent the different elements in the application, including paragraphs, headings, lists, and/or other suitable elements). In a second variant, the application representation 130 can include a document object model for a desktop application 20, which can include nodes for the application's windows, menus, toolbars, and other elements. In a third variant, the application representation 130 can include a frame of the computing environment desktop. In this variant, the frame can be semantically segmented and/or labeled. Examples of labels include "text input," "button," "calendar," "page title," "image," "author," "tab," "website," and/or other types of labels. Segments can each have one or multiple labels. Labels can be nested (e.g., within a tree structure) and/or not nested. In an example of this variant, the application representation 130 can include multiple frames. In this example, the frames can be ordered or not ordered. The frames can be contained within a video (e.g., mp4, .mov, etc.) but can alternatively not be within a video. The video can include audio (e.g., audio describing the tasks 120 being performed) and/or can not include audio. In a fourth variant, the application representation 130 can include a hierarchical data structure based on a semantically segmented frame depicting an application 20 and/or computing environment 10. In this variant, the hierarchical data structure can be in HTML but can alternatively use another protocol. The hierarchical data structure can include images (e.g., image segments depicting elements) and/or can not include images. In fifth variant, the application representation 130 can include a hierarchical data structure based on a combination of other hierarchical data structures (e.g., for each application 20). In an example, an HTML DOM and a hierarchy generated from an image of a native application 20 are combined into one hierarchical representation. In a sixth variant, the application representation 130 can include an encoding representing the elements within the set of applications 20 on the computing environment 10. In this variant, each element and/or application 20 can have its own encoding. Alternatively, groups of elements and/or applications 20 can have their own encoding. Alternatively the entire computing environment 10 can be encoded with one encoding. In a seventh variant, parts of any of the aforementioned variants can be combined. The application representation 130 can be written in HTML, JavaScript, python, C#, XML, SVG, and/or any other suitable language and/or protocol. The application representation 130 can be determined by the application representation model 220, by a screen recording function within the computing environment 10, by a set of semantic segmentation models or object detectors (e.g., one for each element type, etc.), and/or by any other system component. However, the application representation 130 can be otherwise configured.

The system can include a set of models, which function to process information to facilitate the determination of RPA instructions. The set of models can include one or more of: a task model 210, an application representation model 220, a classification model 230, an instruction model 240, a validation model 250, a remediation model 260, and/or any other suitable models. The models can be machine learning models (e.g., LLMs, CNNs, DNNs, RNNs, donut models, etc.) but can alternatively include algorithms, rule-based systems, filters, and/or any other suitable systems. The models can ingest text, video, images, image segments, labels, encodings, semantic information, metadata, code, tasks 120, and/or any other suitable types of data. The models can output text, code, image segments, semantic information, tasks 120, encodings, and/or other suitable types of data. The models can be finetuned, primed, trained (e.g., using reinforcement learning, supervised learning, semi supervised learning, unsupervised learning, etc.), and/or otherwise determined.

Figure 11B:
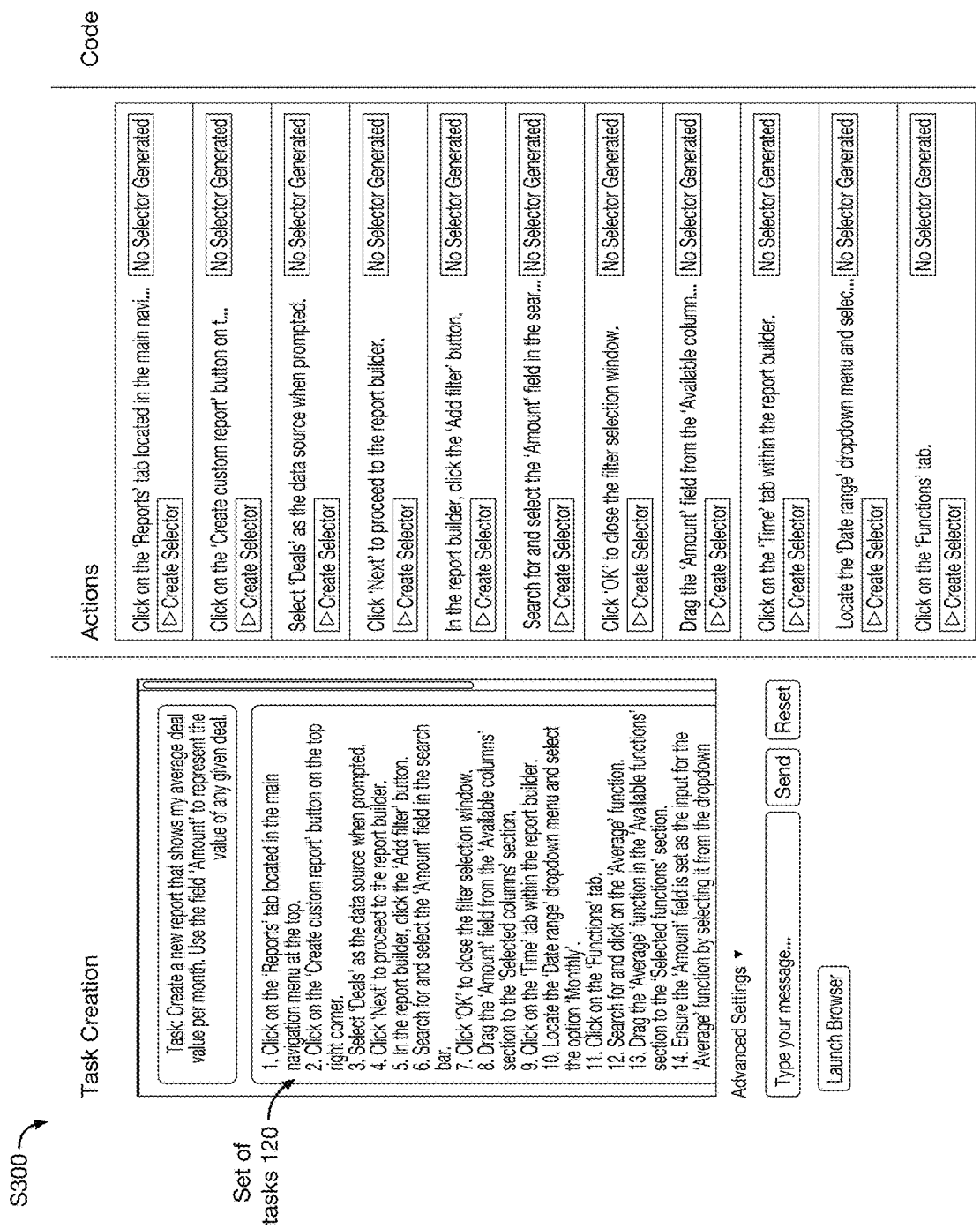
Figure 12A:
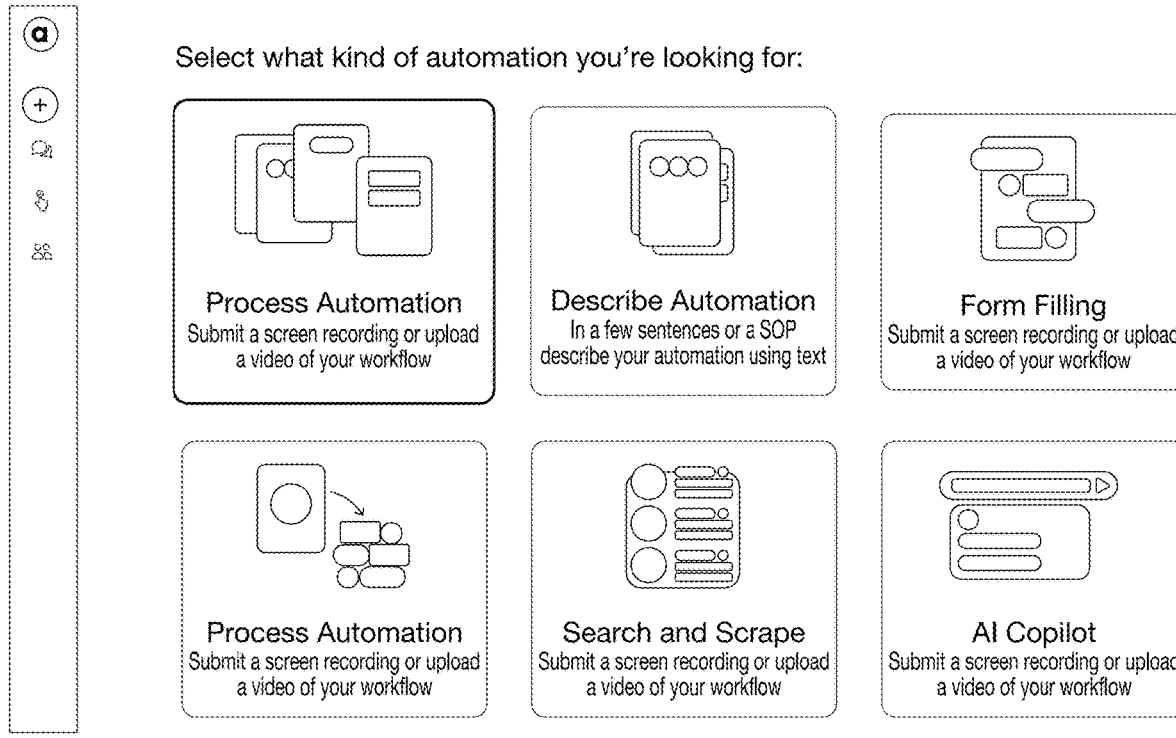
FIGS. 12A-12G are illustrative examples of user interfaces for interacting with variants of the system.

The task model 210 can function to break down an automation request 110 into a set of tasks 120 for an automation request or workflow (e.g., example shown in FIG. 11B). The system can include one task model 210 or multiple task models 210. The task model 210 can be trained to generate tasks 120 for different applications 20, computing environments 10, complexity levels, and/or any other context- or request-specific variables (e.g., examples shown in FIG. 12A). The task model 210 can use information about the computing environment 10 (e.g., from the automation request 110, an application representation 130, etc.) but can alternatively not use information about the computing environment 10. The task model 210 can order, reorder, or not order tasks 120. The output of the task model 210 is preferably an ordered or unordered set of tasks 120. The task descriptions can include: text, visual segments, encodings (e.g., of the interaction elements, of the interaction elements' visual segments, etc.), and/or other modalities. The output of the task model 210 can optionally additionally include a computing environment and/or application frame for each task 120; a computing environment and/or application segment for each task 120; application information (e.g. an indicator of which application 20 to use, an indicator of the starting application state for the task, etc.), an element reference (e.g., an element within the application representation 130, application 20 and/or computing environment 10); parameter information (e.g., text, numbers, etc.); any combination of the aforementioned information per-task or per-set of tasks; and/or any other suitable type of information.

In an example, the task model generates a human-readable list of tasks. In a second example, the task model 210 generates a set of image segments of a user interface (UI) (e.g., an element representation) each depicting an element within the application. However, the output of the task model 210 can be otherwise configured.

Figure 4:
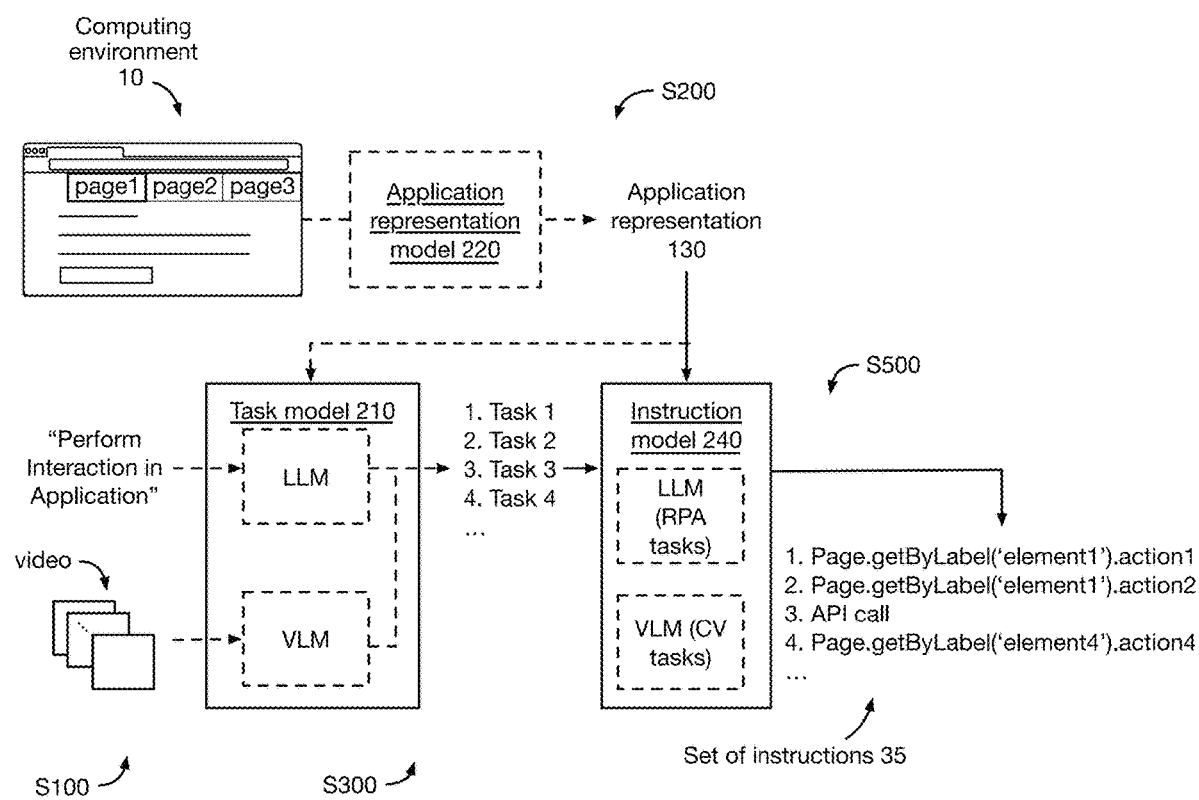
FIG. 4 is a schematic representation of a variant of the task model.

The task model 210 can determine the tasks from: visual information (e.g., video, screenshots, etc.), audio (e.g., a user describing the workflow, button tones, etc.), text, and/or any other suitable input (e.g., from the automation request or from another source). In a first variant, the task model 210 is a computer vision-based model which can determine tasks 120 being performed based on information from a set of frames. In this variant, the task model 210 can determine which frames within the set of frames include information about a task 120 being performed. The task model 210 can additionally determine the segment of a frame relevant to a performed task 120 (e.g., a UI element). The task model 210 can use a 3D CNN, TCN, RNN, attention mechanisms, one-stage detector, two-stage detector, GCNs, transformers, GPT, an LLM (llama, bard, etc.), a VLM (e.g., donut), MLM, and/or another type of machine learning-based method. In this variant, the input to the task model 210 can include a video (e.g., example shown in FIG. 4), a frame, a segment of the frame corresponding to the task 120, parameter information within the segment (e.g., the button title, input text, etc.), an audio recording describing the task 120, a transcription of the audio recording, and/or other suitable information. In an example, the task model 210 generates a description of the set of tasks 120 (e.g., actions and associated interaction elements) being performed given a video of the workflow. However, the computer vision-based variant of the task model 210 can be otherwise configured. In a second variant, the task model 210 is an instruction-based task model 210. In this variant, the task model 210 can determine a set of tasks 120 by decomposing a process description into tasks 120 to complete the process. In this variant, the task model 210 can include an LLM, MLM, or other model using a Seq2Seq, GRU, convolutional layers, transformers, HANs, translations and/or other suitable model architecture elements. In this variant, the input to the task model 210 can include unstructured text (e.g., a paragraph), structured text (e.g., questionnaire responses, a list of tasks 120, etc.), a set of instructions 35 (e.g., from a prior iteration of the method), HTML code, an HTML DOM, a native application underlying structure (e.g., application layout), and/or any combination of aforementioned information and/or other inputs. However, the description-based variant of the task model 210 can be otherwise configured. In a third variant, the set of tasks 120 can be received from a user. In this variant, the task model 210 can determine a set of tasks 120 by receiving the set of tasks 120 from a user. In a first example of this variant, the entire set of tasks 120 is received (e.g., as text). In a second example of this variant, the list is generated by compiling responses from a questionnaire or conversation with a conversational LLM. In a fourth variant, the task model does not use an application representation 130 to determine the set of tasks 120. In a fifth variant, the task model can include a combination of the above. However, the task model 210 can otherwise generate the set of tasks 120 from user input.

In alternative variants, existing sets of tasks 120 can be combined and/or re-used. For example, the task model 210 can identify similarities between a set of prior workflows and the new workflow from the automation request, and build a task list for the new workflow from tasks from the prior workflows that are associated with the similarities.

The task model 210 can be primed (e.g., using a set of examples of automation request-task set pairs, the model's goal can be specified to output a set of tasks 120 that will accomplish the goal of the automation request 110), fine-tuned (e.g., using automation request-task set pairs), trained, or otherwise generated. However, the task model 210 can otherwise be configured.

The application representation model 220 functions to generate and/or transform the application representation 130 for the application 20. The input of the application representation model 220 can include an existing application representation 130 (e.g., a frame depicting the computing environment 10), application HTML, a visual representation of the application 20 (e.g., a screenshot, screen recording, etc.), hierarchical information describing sets of elements within an application 20, information about an application's backend, scraped text from a set of applications 20, and/or any other suitable information about an application 20 and/or computing environment 10. The input of the application representation model 220 can represent one application 20 or multiple applications 20. The output of the application representation model 220 can include an application representation 130, but the application representation model 220 can additionally generate other information about the application 20 and/or computing environment 10 (e.g., a text description of the application 20, etc.). The system can use the same application representation model 220 to generate application representations 130 for each application 20, or use different application representation models 220 for each application 20 or application type. The system can use the same or different application representation models 220 to generate application representations 130 for different application states (e.g., one for a starting application state, one for a task performing state, one for a target application state, etc.). The system can use multiple application representation models 220 in parallel and/or in series to generate more complex information about the application 20 or set of applications 20. In an example, an application model generates a set of hierarchical HTML information based on a screenshot of a native application 20 and combines it with a DOM describing a web application within the same computing environment 10.

The application representation model 220 can include any suitable model architecture. In a first variant, the application representation model 220 includes an encoder which can encode an image, an HTML DOM, a video, a frame, and/or any other suitable application component or application representation as a vector. In a second variant, the application representation model 220 includes a segmentation model. In this variant, the application representation 130 uses instance-based segmentation, semantic segmentation, and/or any other suitable form of segmentation. In this variant, the application representation model 220 can segment individual interaction elements and/or set of interaction elements in the application representation 130. For example, the application representation model 220 can generate an element segment, element locations(s) (e.g., a bounding box, position of an element center, corner, etc.), element metadata, and/or any other suitable type of segment-based information. In an example of this variant, the application representation model 220 can additionally include an encoder which embeds the identified segments into an encoding (e.g., a feature vector). In a third variant, the application representation model 220 can include a structural generator. In this variant, the application representation model 220 can turn an HTML file (and/or any other suitable file type) into a document object model (DOM), an abstract syntax tree (AST), and/or other structural representation. In this variant, the application representation model 220 can parse HTML nodes and generate a DOM tree from relationships between nodes. In a fourth variant, the application representation model 220 can include a UI hierarchy scraper which can scrape hierarchical information relating to the UI and/or application 20 from an application (e.g., by introspecting the application structure, by navigating through the application, etc.). In a fifth variant, the application representation model 220 runs through different scenarios to generate the application representation 130 (e.g., performs a set of predetermined actions or tests on the applications 20 to generate a set of application responses). In a sixth variant, the application representation model 220 can compile and/or interpret the application code to generate an AST. However, any of the aforementioned variants can be combined in series and/or in parallel. Alternatively, any other suitable type of model can be used.

Figure 5:
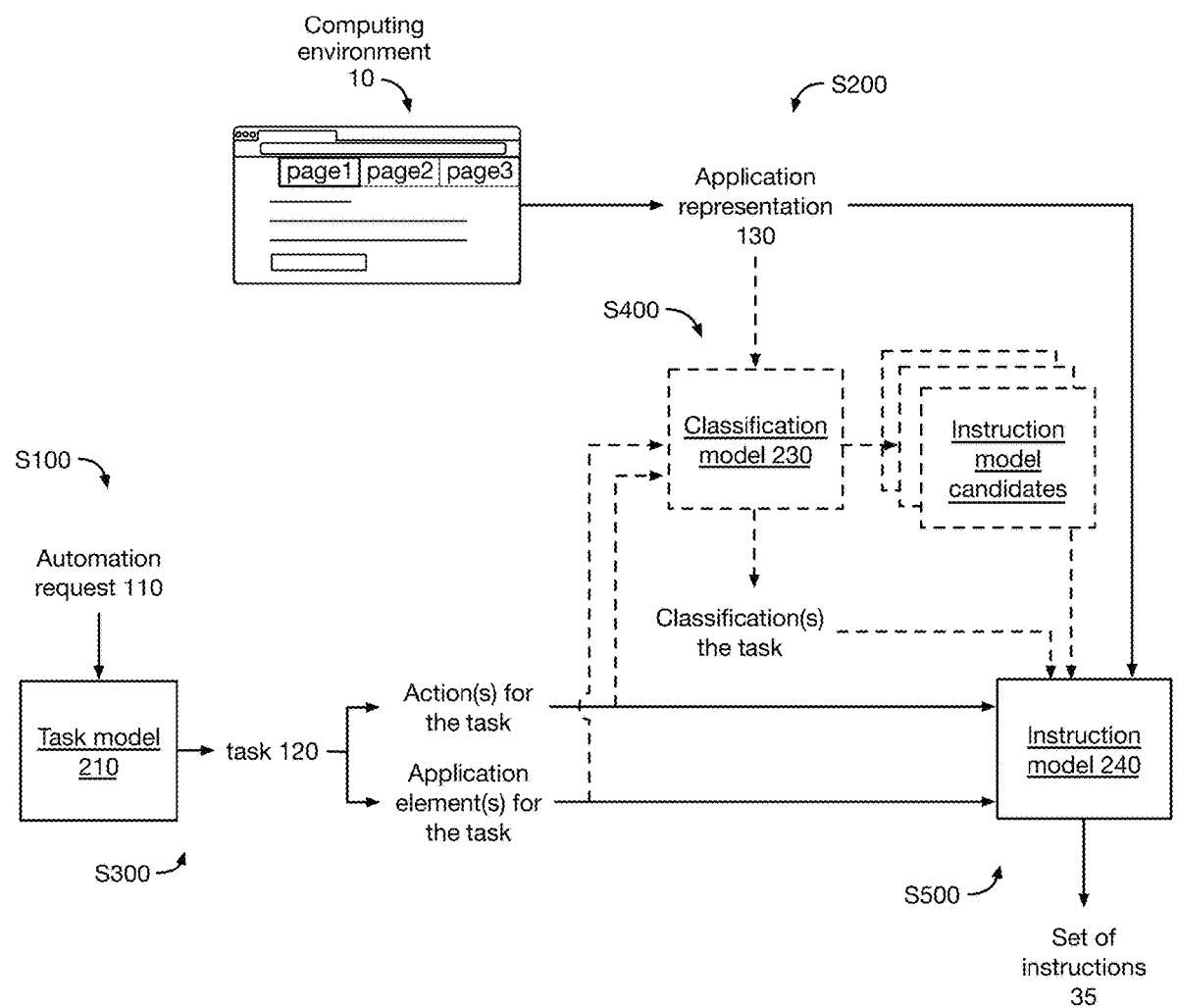
FIG. 5 is a schematic representation of a second variant of the system.

The classification model 230 can function to classify tasks 120 within the list of tasks 120 (e.g., example shown in FIG. 5). In an example, code for different task classes is generated using models specific to the task class. The classification model 230 can preferably be a language model, but can additionally or alternatively include logistic regression, decision trees, a random forest, a CNN, support vector machines (SVM), and/or any other suitable machine learning architecture. Additionally or alternatively, the classification model 230 can use a set of heuristics. The classification model 230 can classify tasks 120 individually or with other tasks 120 as context. Examples of task classifications include "interaction element step," "API call," "dead reckoning step," "computer vision step," "requires application Y," "button press step," and "text field fill step", but the task classifications can include any other suitable type of task classification. The classification model 230 can ingest each task 120 individually or can ingest multiple tasks 120 together. Classifications can be based on each task 120 only or can be based on tasks 120 before and/or after the present task 120. Classifications can additionally or alternatively be based on user preferences, an application representation (e.g., to facilitate determination of available applications and interaction elements), application representations 130 (e.g., classifying tasks as an API call when a suitable element for executing the task does not exist in the application, etc.), and/or other suitable information. In a first variant, the output of the classification model 230 is a classification category for a task 120. In a second variant, the output of the classification model 230 is a task action (e.g., "click") and an application element (e.g., "submit button"). However, the classification model 230 can have any other output. The classification model 230 can be trained using inputs and targets. Examples of classification training inputs include manually- or automatically-generated tasks 120, tasks 120 which have been used in prior iterations of the method, and/or any other suitable tasks 120. Examples of classification training targets include classifications from set of tasks 120s which have been used to generate code which compiles, runs, and/or accomplishes the desired procedure, manually- or automatically-generated classifications, and/or any other suitable set of classifications. However, the classification model 230 can be otherwise configured.

Figure 7:
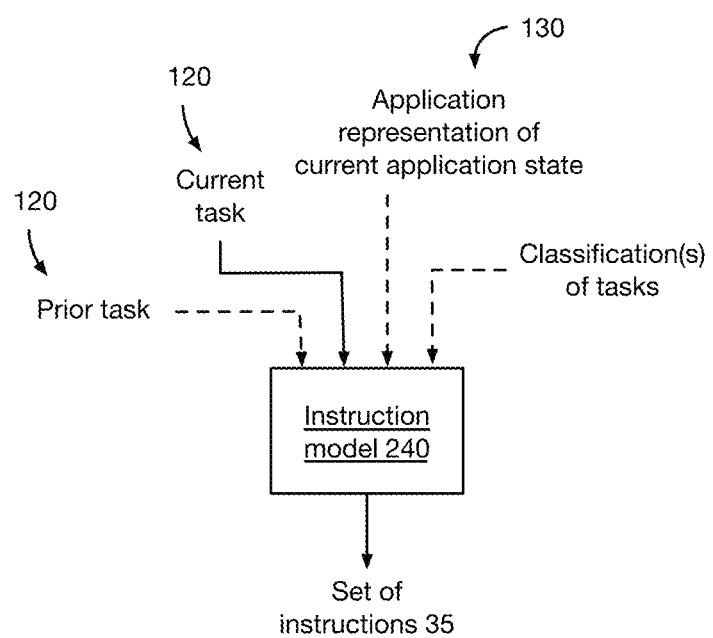
FIG. 7 is a schematic representation of a variant of the instruction model.
Figure 11C:
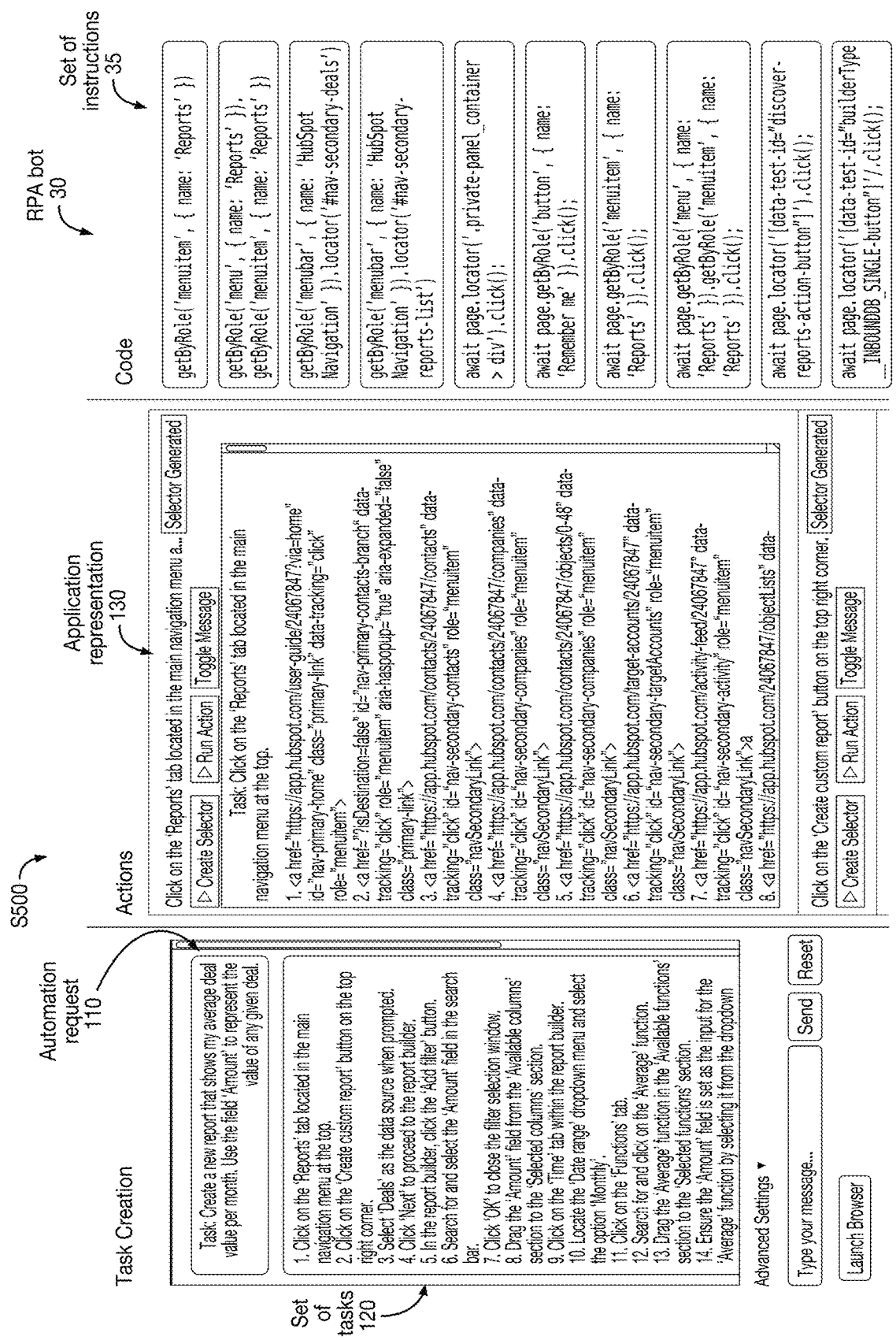
Figure 11D:
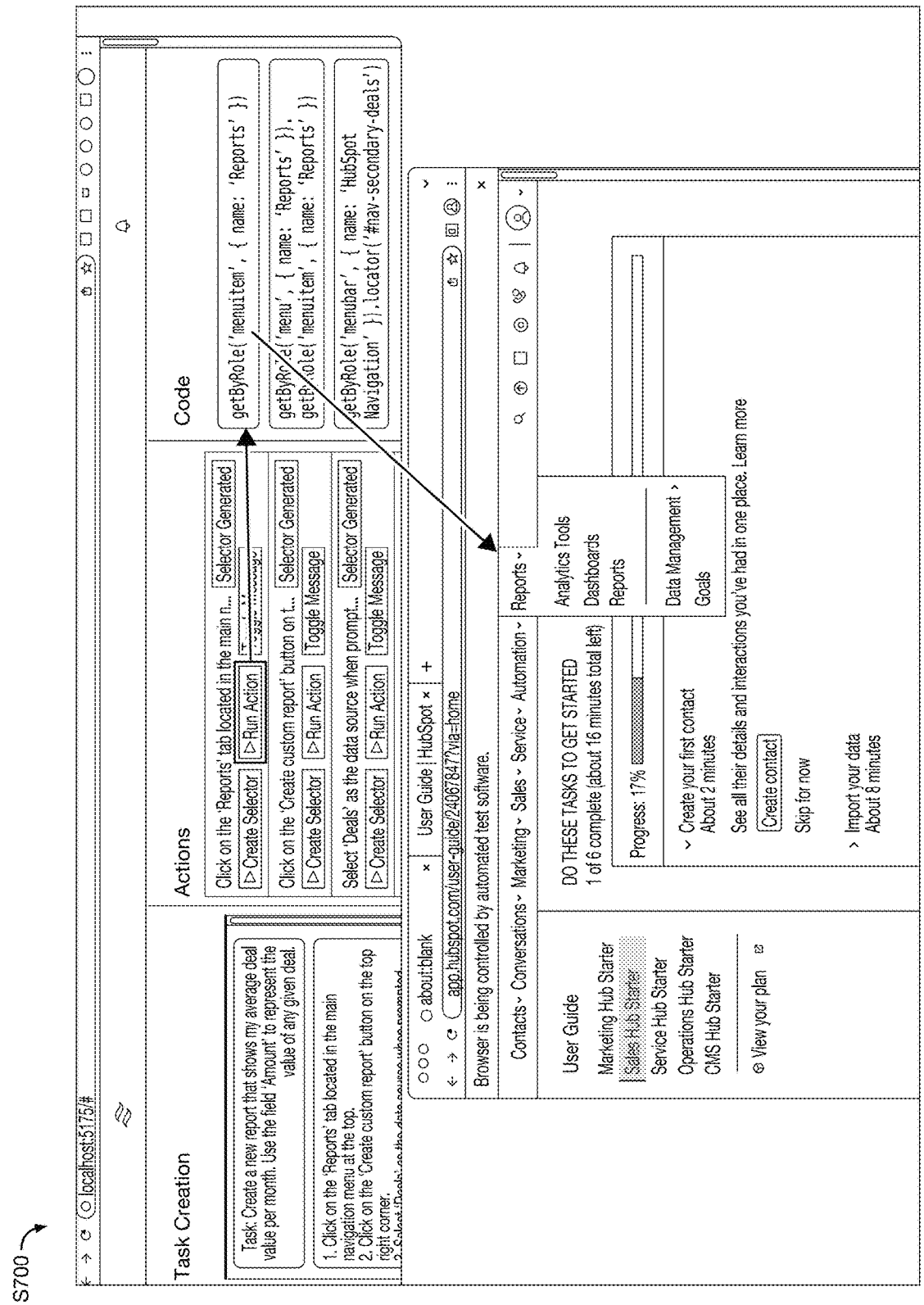

The instruction model 240 can function to determine a set of instructions 35 for the RPA bot 30 (e.g., examples shown in FIG. 7 and FIG. 11C). The instruction model 240 preferably be an LLM, but can alternatively or additionally include transformers, RNNs, GPT, CNNs, HANs, Seq2Seq, Statistical Machine Translation (SMT), Neural Machine Translation (NMT), llama, bard, VLM such as donut, and/or other model architectures. The system can include one instruction model 240 and/or multiple instruction models 240 (e.g., for different task classes, for different applications 20, for multi-step instruction generation, etc.). The inputs to the instruction model 240 can include a single task 120, a set of tasks 120, an application representation 130, a task classification, contextual information, a previous instruction generated by the instruction model 240 (e.g., for a prior task 120 or for a prior application representation 130) and/or other information. When the set of instructions 35 are for a subset of the overall set of tasks 120, the set of instructions 35 can be based on only a subset of tasks 120 and/or can be based on other tasks 120 (e.g., as context). In a first variant, the instruction model 240 generates a set of instructions 35 on a task-by-task basis given the application 20 and the task 120. The instruction model 240 can also be provided with the prior task, the end application state from the prior task, a subsequent task, the starting application state from the subsequent task, a target application state for the task, and/or information about any other relevant task. In a second variant, the instruction model 240 generates a set of instructions 35 for all tasks 120 in a single shot. However, the instruction model 240 can otherwise generate tasks 120.

The optional validation model 250 functions to evaluate the set of instructions 35 against the set of tasks 120 (e.g., example shown in FIG. 6). In a first variant, the validation model 250 validates that the set of instructions 35 accomplishes the respective task 120. In a second variant, the validation model 250 validates that the set of instructions 35 create a computing environment 10 that has the target elements necessary for the text set of instructions 35 and/or the next task 120. However, the validation model 250 can otherwise evaluate the set of instructions 35. The validated model can validate the set of instructions 35 against an instance of the application 20 (e.g., a text instance), an application representation 130, and/or a comparison of application instances or application representations 130. The validation model 250 is preferably an LLM but can alternatively include transformers, RNNs, GPT, CNNs, HANS, Seq2Seq, Statistical Machine Translation (SMT), Neural Machine Translation (NMT), llama, bard, a VLM such as donut, and/or any other suitable machine learning-based architecture. Alternatively or additionally, the validation model 250, can use a heuristic, a set of rules, a linter, a style checker, and/or any other suitable architecture. The inputs to the validation model 250 can include diagnostic information (e.g., output by the application representation model 220, by the application itself, or by another component, etc.), an application pre-execution state (e.g., an application representation, etc.), application post-execution state (e.g., target state), error information from the computing environment 10, the set of instructions 35, the set of tasks 120, task classifications, the computing environment error information, and/or any other suitable type of information or combination of types of information. The validation model 250 can output binary pass/fail information (e.g., wherein the validation model 250 is used as a logic gate), additional error messages (e.g., error messages indicating run time error or compiling error), an amended set of instructions 35 (e.g., wherein the validation model 250 is integrated with the instruction model 240 and/or remediation model 260), a set of failed tasks, and/or any other suitable type of output. In a first variant, the validation model 250 compares an actual application end state (e.g., an application representation 130) to a target application end state (e.g., an application representation 130) and generates an output (e.g., pass/fail) based on the difference. In a second variant, the validation model 250 compares a pre-task application state and a post-task application state and generates an output based on the difference (e.g., whether a change has occurred, whether a target change has occurred, etc.). In a third variant, the validation model 250 facilitates manual validation of the set of instructions 35 (e.g., by displaying the application state post-instruction set execution and receiving a user input). In a fourth variant, the validation model 250 detects an error message generated by the application 20 and/or computing environment 10. However, the validation model 250 can be otherwise configured.

Figure 6A:
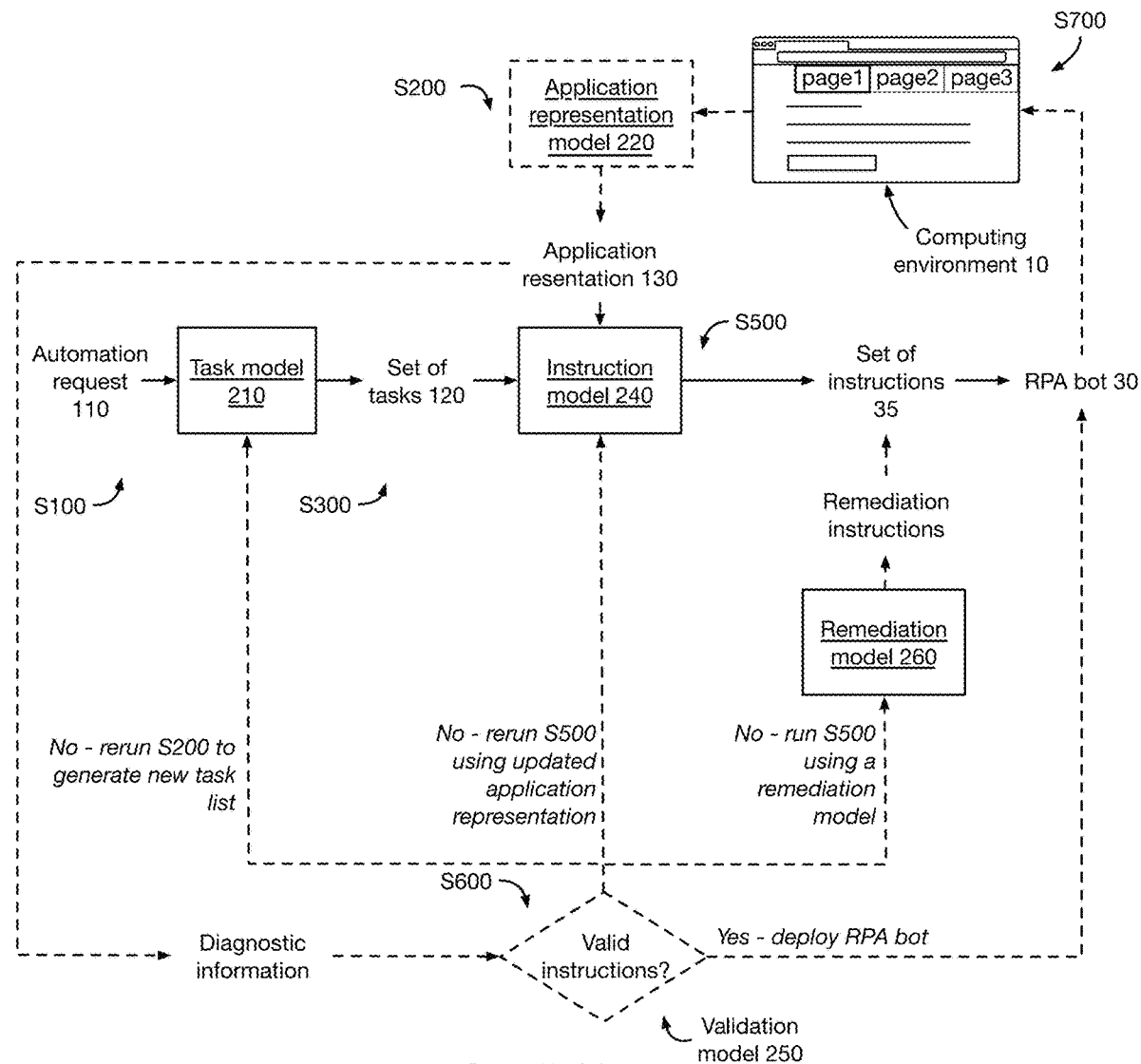
FIGS. 6A and 6B are a schematic representation of a first and second variant of validating the set of instructions.
Figure 6B:
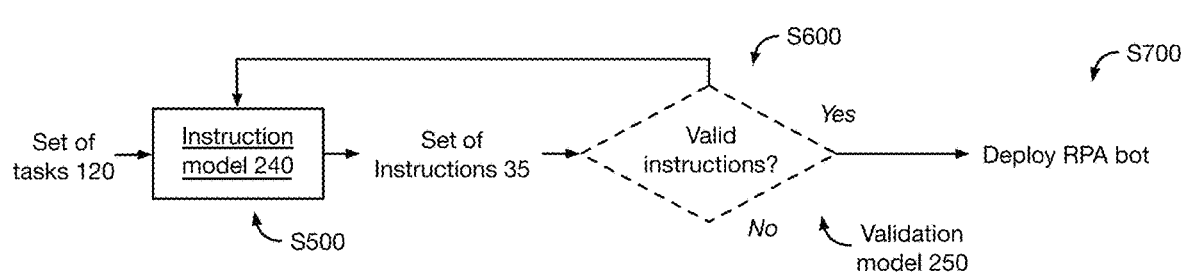

The remediation model 260 functions to remediate failed instruction sets (e.g., instructions identified by the validation model 250; example shown in FIG. 6A). The remediations can be determined without any a priori knowledge about the application state (e.g., no information about the elements on the application, with limited a priori knowledge of the application state (e.g., a screenshot of the application without any semantic labels, etc.), with a priori knowledge about the application state (e.g., an application representation with semantic labels, etc.), and/or with any other suitable knowledge about the application state. In a specific example, the remediation model 260 determines remediation instructions that change the computing environment 10 and/or application state to allow the task 120 to be performed and/or enable the instruction set execution to complete the task 120. In a second specific example, the remediation model 260 determines a new set of tasks 120 and/or amends the existing set of tasks 120. In a third specific example, the remediation model 260 determines a set of remediation instructions that remediate the computing environment 10 and/or application state after task instruction set execution. However, the remediation model 260 can otherwise remediate the computing environment and/or application set.

The remediation model 260 can be used when the validation model 250 indicates that the set of instructions 35 are invalid and/or responsive to any other suitable condition. The remediation model 260 can be used during generation of the set of instructions 35, during runtime (e.g., at all times, when a set of instructions 35 fails, at specific intervals, etc.), and/or at any other suitable time.

Figure 9:
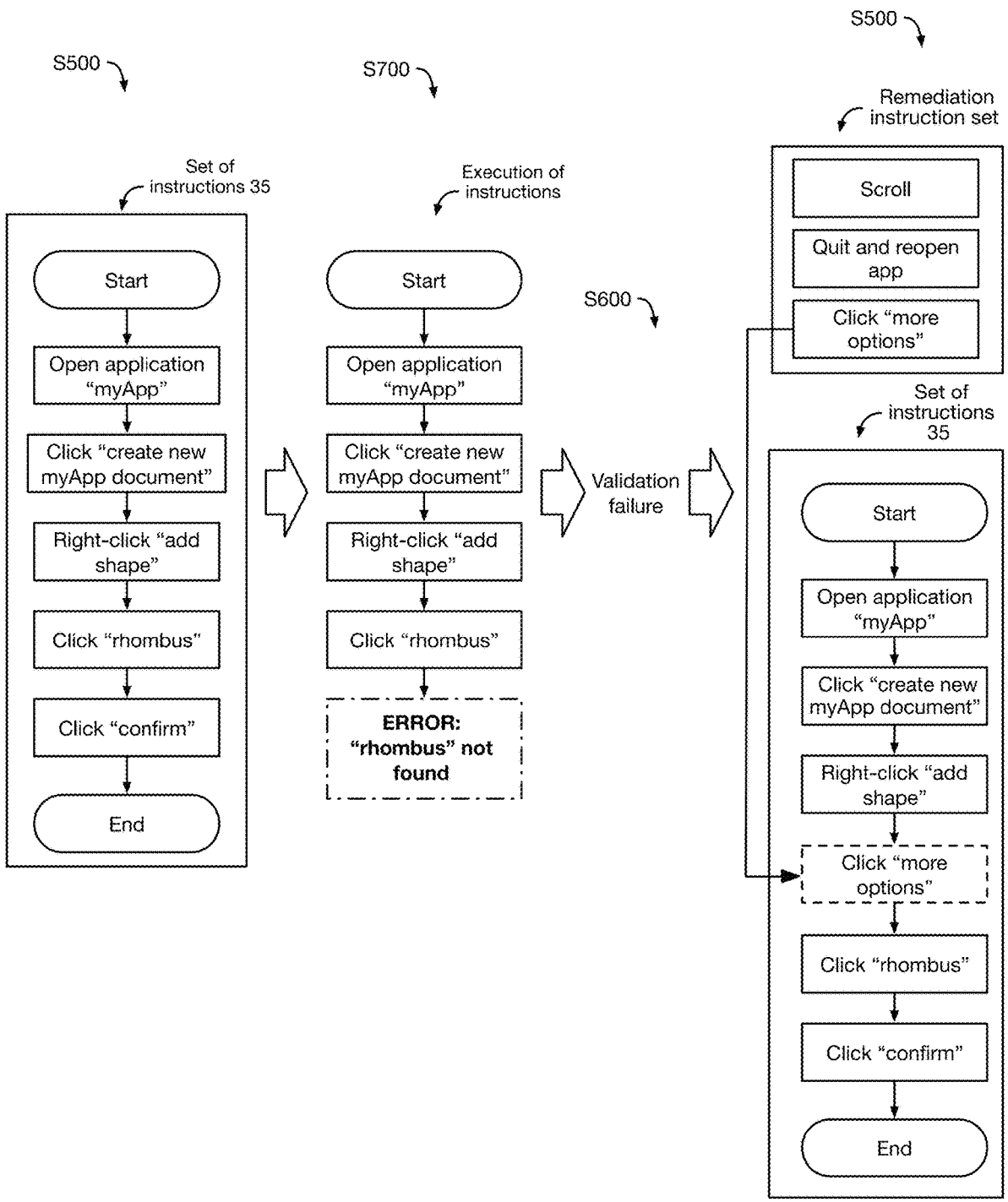
FIG. 9 is an illustrative example of a variant of remediation instructions.

In a first variant, the remediation model 260 can be a machine learning model. In a first example, the model includes a classifier which determines a first application state (e.g., an application representation 130 of the application 20 before failure and/or after failure) and predicts a set of remediation options that will change the application 20 from the first application state to the target application state. In a second example, the model includes an LLM which describes a post-failure application state (e.g., in an application representation 130, in human-readable text, an embedding, etc.), describes a pre-failure application state, and recommends a set of remediation options (e.g., in code, in human-readable form, in task form, etc.). In this example, the remediation options can come from a predetermined list (e.g., example shown in FIG. 9) or can be generated. However, other machine learning models can be used. In a second variant, the remediation model 260 can include a set of remediation options. In this variant, a remediation option can be a set of instructions (e.g., code snippets), a set of tasks 120, a set of human-readable instructions, and/or any other type of remediation option. Examples of remediation options include "scroll up," "scroll down," "scroll right," "scroll left," "close modal/popup," "click on button X," "go back to prior page/frame," "view history," "open help bar," and/or any other suitable remediation option. In an example, remediation options can include amending a set of pixel coordinates within a set of instructions (e.g., when the set of instructions fails due to a change in the UI). Alternatively, remediation options can be a generated set of instructions 35. In a specific example, the remediation model can determine a remediation option by: executing the remediation option before a target task 120, executing the set of instructions 35 corresponding to the target task 120, validating the set of instructions 35 based on the output of instruction execution, and adding the remediation option to the RPA bot (e.g., before the target task) if the remediated task passes the validation step, and excluding the remediation option from the RPA bot and/or attempting another remediation option if the remediated task does not pass the validation step. However, the validation module can be otherwise configured.

The models can include classical or traditional approaches, machine learning approaches, and/or be otherwise configured. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, DNN, CAN, LSTM, RNN, encoders, decoders, deep learning models, transformers, etc.), ensemble methods, optimization methods, classification, rules, heuristics, equations (e.g., weighted equations, etc.), selection (e.g., from a library), regularization methods (e.g., ridge regression), Bayesian methods (e.g., Naïve Bayes, Markov), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, and/or any other suitable model. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture. The models can extract data features (e.g., feature values, feature vectors, etc.) from the input data, and determine the output based on the extracted features. The features (e.g., encoding) can be non-human readable or non-human comprehendible, or be human comprehendible. However, the models can otherwise determine the output based on the input data.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. The models can be learned or trained on: labeled data (e.g., data labeled with the target label), unlabeled data, positive training sets (e.g., a set of data with true positive labels, negative training sets (e.g., a set of data with true negative labels), and/or any other suitable set of data.

Models can be trained before the method is performed (e.g., before S100, etc.) and/or can be updated while the method is being performed (e.g., responsive to a failure of a deployed RPA bot 30). The models can be trained using information about failure (e.g., an error message), the set of tasks 120 during failure, the set of instructions 35 during failure, and/or any other suitable information. However, the models can be trained at any other suitable time. The models can optionally be validated, verified, reinforced, calibrated, or otherwise updated based on newly received, up-to-date measurements; past measurements recorded during the operating session; historic measurements recorded during past operating sessions; or be updated based on any other suitable data. Training data can be manually generated and/or automatically determined. In an example, the models use sets of tasks 120 corresponding to successfully-executed sets of instructions 35 to train the task model. Models can be trained with or without using problem-specific information. In a first variant, models are trained using information about the computing environment and available applications. In a second variant, models are trained using user preferences. In a third variant, the models are general models applied to differing computing environments with differing available applications. In a fourth variant, the models are general models which are refined using information about the computing environment and/or available applications. However, the models can be otherwise trained.

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

However, the system can be otherwise configured.

4. Method

The method can function to generate an RPA bot 30 that automates an interaction with a set of applications 20 (e.g., a workflow). The method can include: receiving an automation request S100, determining an application representation 130 of an application 20 associated with the automation request S200, generating a set of tasks based on the automation request S300, optionally classifying each task in the set of tasks S400, generating a set of instructions 35 for each task in the set of tasks S500, optionally validating the set of instructions S600, optionally executing the set of instructions S700 and/or optionally remediating failed instruction sets. The method can be performed at any suitable time. All or portions of the method can be performed in real time (e.g., responsive to a request), iteratively, concurrently, asynchronously, periodically, and/or at any other suitable time. All or portions of the method can be performed automatically, manually, semi-automatically, and/or otherwise performed.

The method processes can be performed in any suitable order. In a first variant, the method can include performing S100, S200, S300, S400, S500, S600, and/or S700 in order. In a second variant, the task generation step S300 is performed once and the instruction generation step S500 and instruction validation step S600 are performed multiple times (e.g., for different application versions, when instruction set failure is detected, etc.). However, the steps of the method can be performed in any other suitable order.

All or portions of the method can be performed before runtime (e.g., runtime of the RPA bot 30), during, or after runtime. In a first example, the RPA bot 30 can be created and then deployed to control the applications 20 within the computing environment 10. In a second example, the RPA can execute a portion of its instructions 35 (e.g., a portion of the set of instructions 35 generated during a prior instance of the method) and can iteratively perform S500 when a failure condition is met (e.g., a task is failed, an instruction fails, etc.) until a success condition is met (e.g., a task is accomplished, an instruction succeeds, a target application state is achieved, etc.). In a third example, the system can generate an RPA bot 30 on-the-fly during runtime using the set of tasks 120 and an application representation 130 of the application. The application representation 130 can be predetermined or be determined in real time (e.g., during runtime). In a specific example, the system can, for each task 120, determine an application representation 130 (e.g., taking a screenshot and segmenting out interaction elements, etc.) and generate a set of instructions 35 for the upcoming task 120 in the set of tasks 120 using the application representation 130. All or portions of the method can be performed on a separate computing system, a remote computing system, be performed within the computing environment 10, and/or be performed on any other suitable computing system.

Figure 12B:
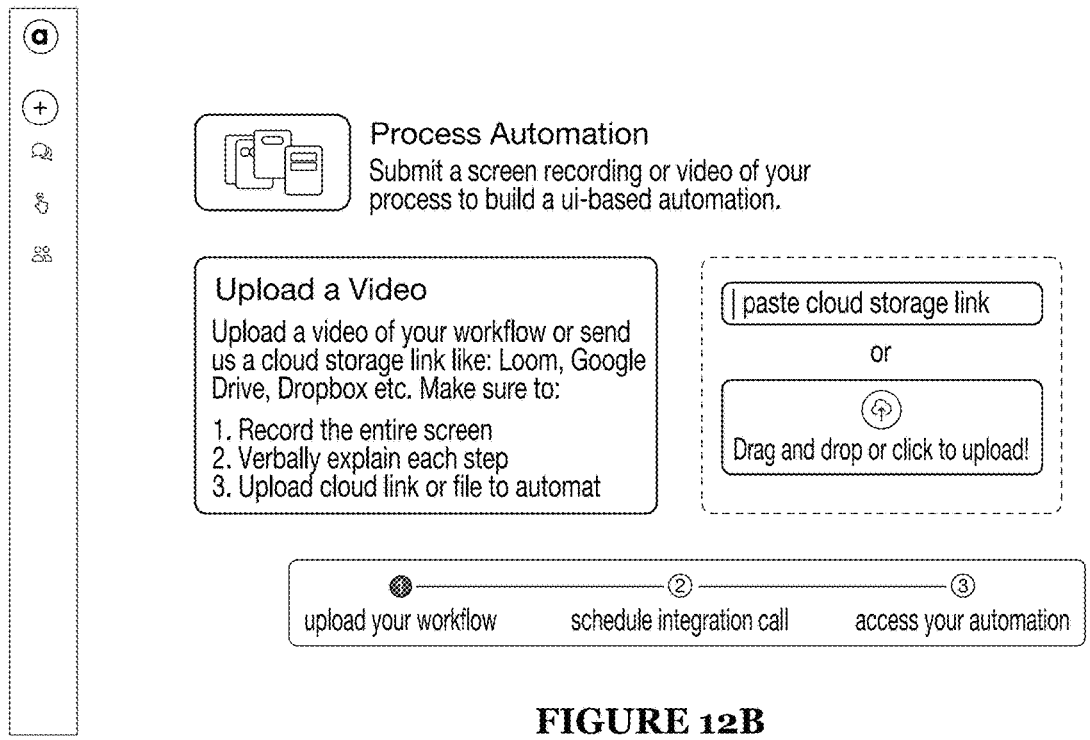
Figure 12C:
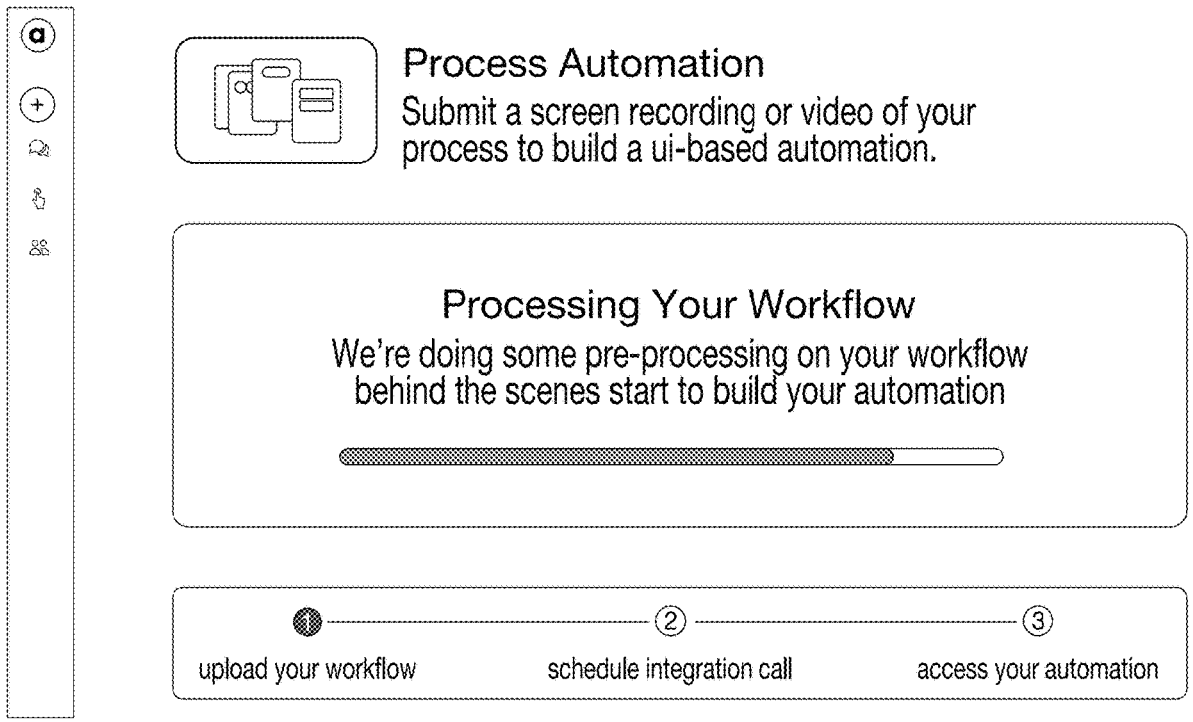
Figure 12D:
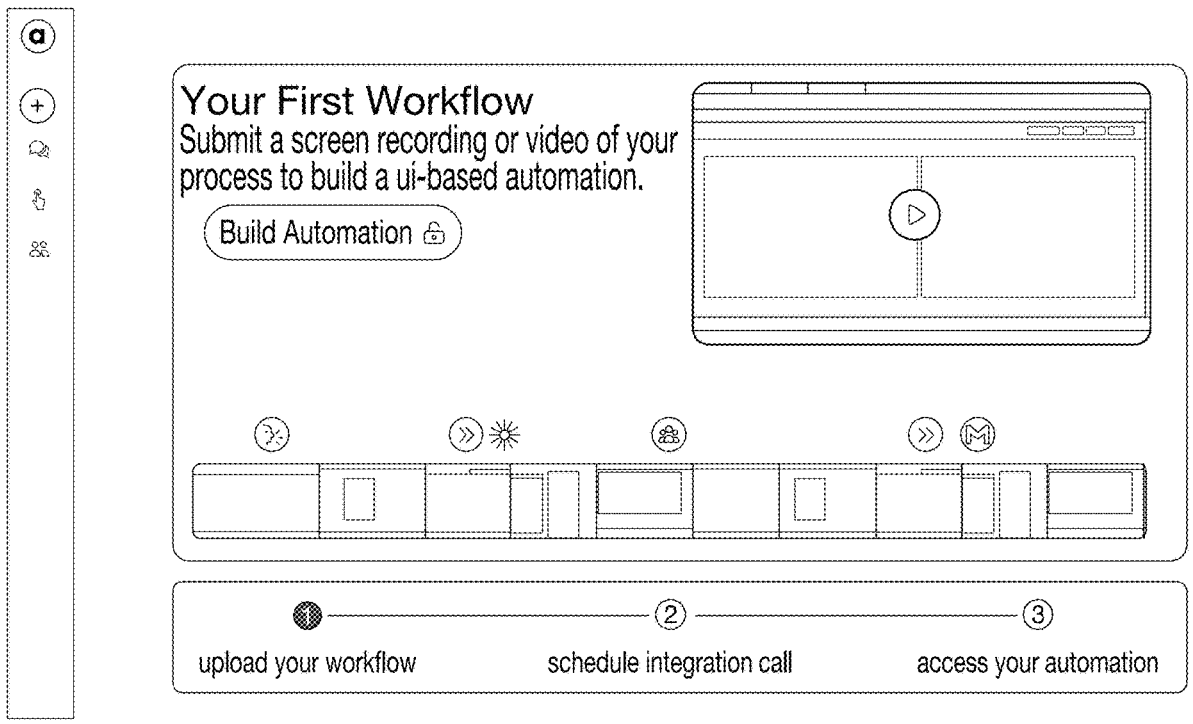
Figure 12E:
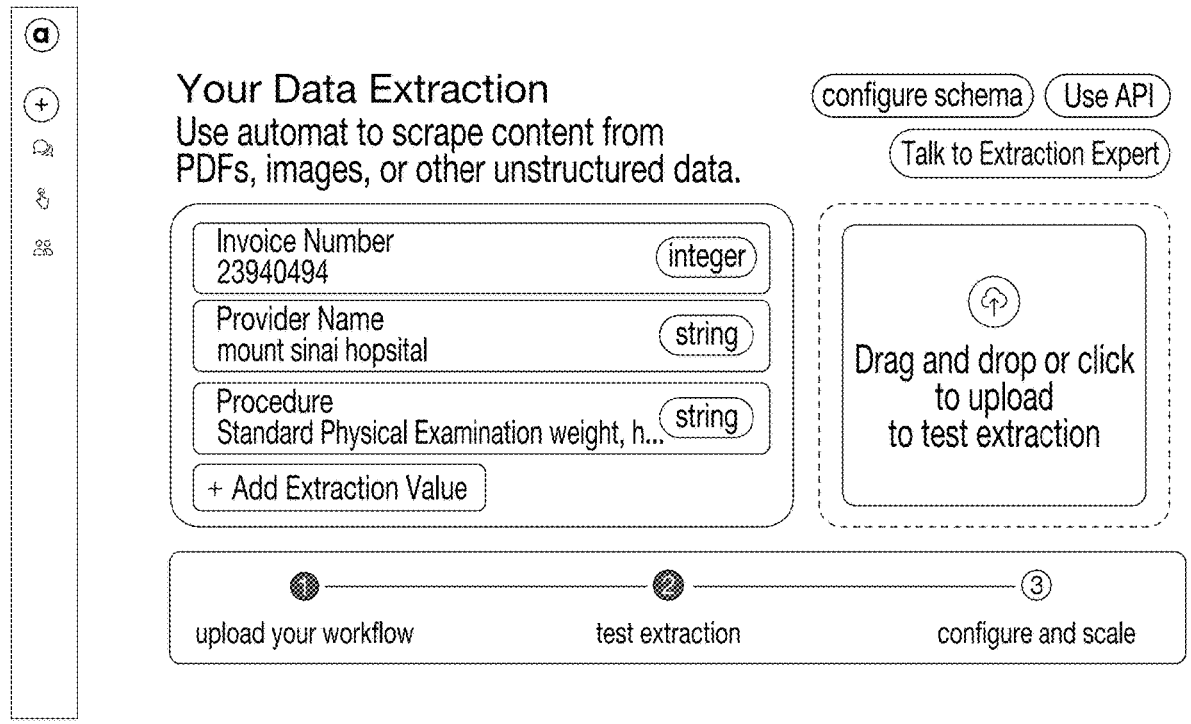
Figure 12F:
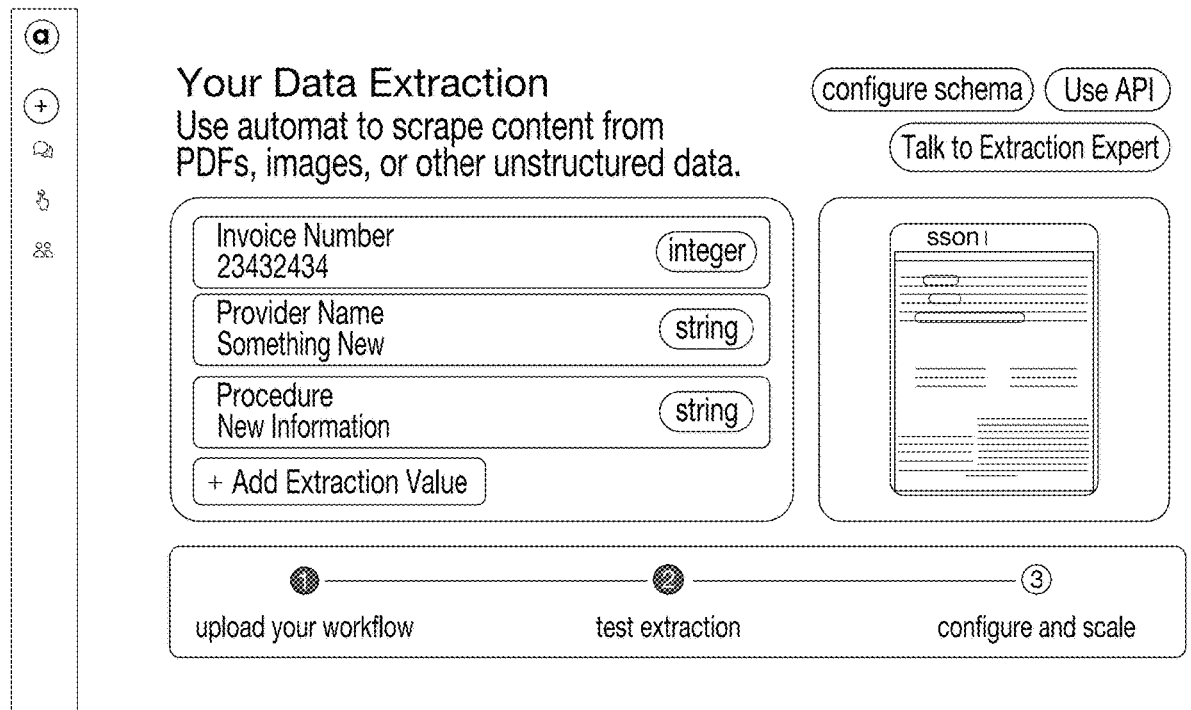
Figure 12G:
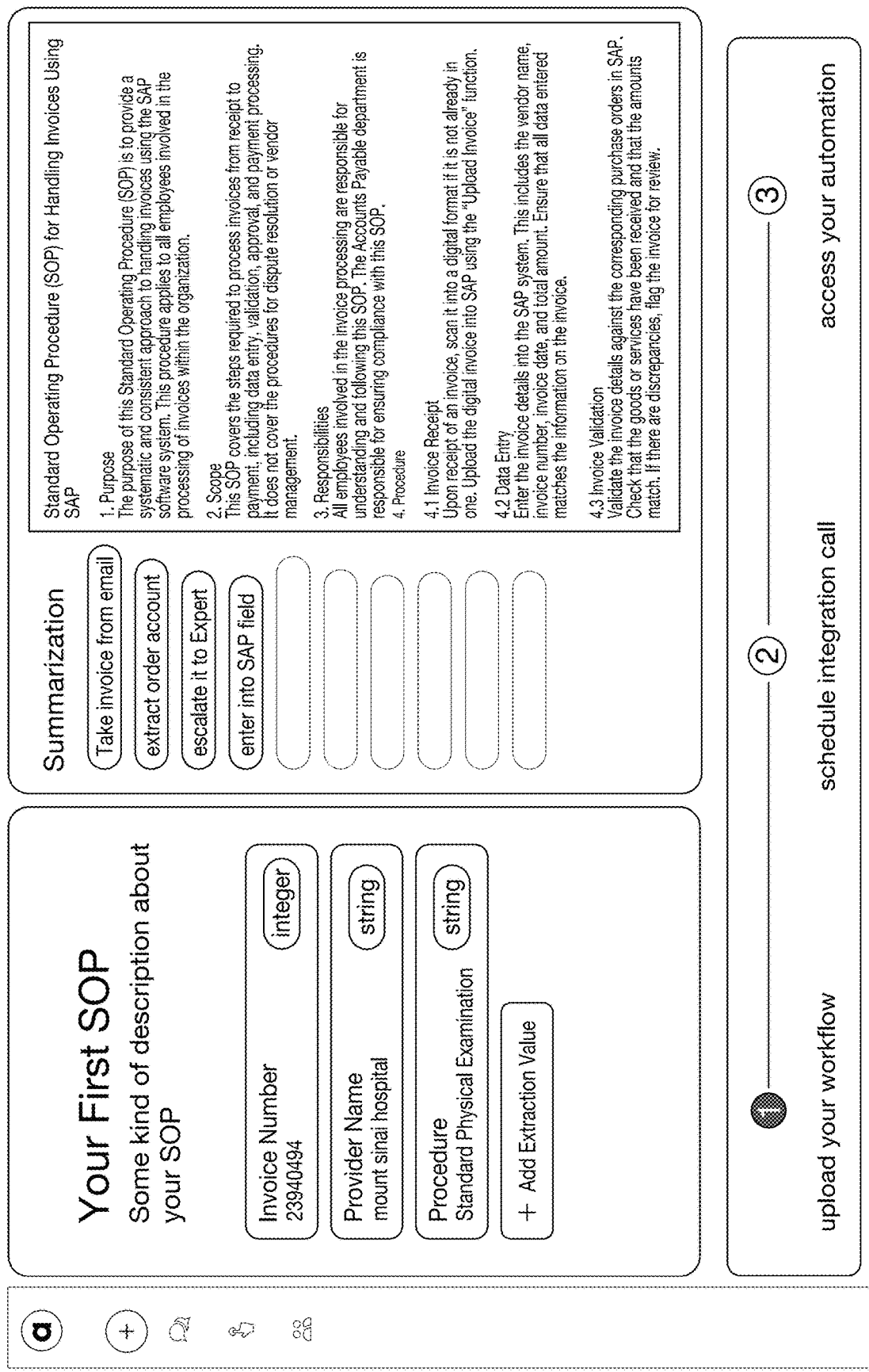

Receiving an automation request S100 can function to determine the automation request 110 representing the procedure that the user wants to automate. S100 can be performed by the same computing system that runs the computing environment 10 or a different computing system. S100 can be performed once, repeatedly, and/or at any suitable number of times. In a first variant, S100 is performed before any other steps are performed. In a second variant, S100 is performed responsive to a change in the computing environment 10 (e.g., when the application interface and/or backend updates). In a third variant, S100 is performed responsive to an error during execution of a prior set of instructions 35. In a fourth variant, S100 is performed when the desired workflow changes or when a user submits a new automation request. However, S100 can be performed at any other suitable time. The automation request 110 can be received from the user, from a remote endpoint, from a different program, and/or any other suitable entity. The automation request 110 can include multiple modalities (e.g., video and voiceover, etc.; example shown in FIG. 12B), but can alternatively include only one modality. The method can include receiving multiple automation requests 110 at once, but alternatively can include receiving only one automation request 110 at a time. However, receiving an automation request 110 can be otherwise performed.

Determining an application representation of an application associated with the automation request S200 can function to obtain a deep understanding of the computing environment's interface, applications' user interfaces, front end architectures, back end architectures, and/or other elements. S200 is preferably performed using the application representation model 220 described above, but can additionally or alternatively be performed using any other suitable model. In a first variant, S200 can include creating a structured representation of an unstructured interaction environment (e.g., a computing environment 10, an application 20). In a second variant, S200 can include creating a reduced-size representation of the application 20 (e.g., to meet the context limit of the interaction model), which can enable the interaction model to ingest (e.g., consider) all relevant elements of the application 20. However, S200 can otherwise create a representation of the application and/or computing environment. S200 can preferably be performed by a different computing system from the computing system which runs the computing environment 10, but can alternatively be the same computing system. The application representation 130 can be received (e.g., from a property of the application 20), generated (e.g., by the application representation model 220), or transformed (e.g., by the application representation model 220), and/or otherwise determined.

In a first variant, the application representation 130 is received from the computing environment 10. In an example, a DOM can be retrieved from a web application 20 using document.documentElement property, window.document property, and/or another suitable method. In a second variant, the application representation 130 is requested from the computing environment 10 (e.g., requested from an application 20 within the computing environment 10). In an example, a DOM is requested. In a second example, a representation of a hierarchy is requested from a native application. In a third variant, the application representation 130 is scraped from the computing environment 10 and/or an application 20. In an example, the DOM is inspected from a website. In a fourth variant, the application representation 130 is captured using or generated from a screen recording from the computing environment 10. The screen recording can be determined from the automation request 110, recorded during runtime (e.g., before the set of instructions 35 for the next task is executed, after execution of a set of instructions 35 for a prior task, etc.). In a first example, the application representation 130 is the screen recording. In a second example, generating the application representation 130 includes segmenting frames (e.g., key frames) from the screen recording using a set of semantic segmentation models and/or detecting target objects using a set of object detectors, and wherein the application representation 130 includes the set of segments, detected objects, and/or the associated attributes (e.g., size, location, number of frames, etc.). In a fifth variant, the application representation 130 is determined based on an existing application representation 130 (e.g., in variants where S200 is performed multiple times). In an example of this variant, the application representation 130 is captured from a screen recording during a first instance of S200 and segmented into a set of interaction element segments for each of a set of distinct frames or keyframes of the screen recording during a second instance of S200. However, S200 can be otherwise performed.

S200 can occur before or after S100, can occur before, after, or concurrently with S300, and/or can preferably occur before S500, but can alternately be performed at any other time. In an example, S200 is performed between successive iterations of S700 (e.g., wherein after executing instructions corresponding to a first task, the application representation is updated before determining instructions for a second task based on the updated application representation).

In a first variant, S200 is performed at a predetermined frequency. In a second variant, S200 is performed in response to receiving an application representation 130 from the computing environment 10 (e.g., in variants where S200 includes generating a new application representation 130 based on an existing application representation 130). In a third variant, S200 can be performed when an application and/or set of applications is updated. In a fourth variant, S200 can be performed when the set instructions 35 are determined (e.g., S500). In a fifth variant, S200 can be performed when an application update is detected (e.g., the application version number changes, the interaction element layout changes, etc.). In a sixth variant, S200 can be performed when a task failure, code failure, and/or other RPA failure occurs. However, S200 can be performed responsive to any other suitable condition.

Figure 10:
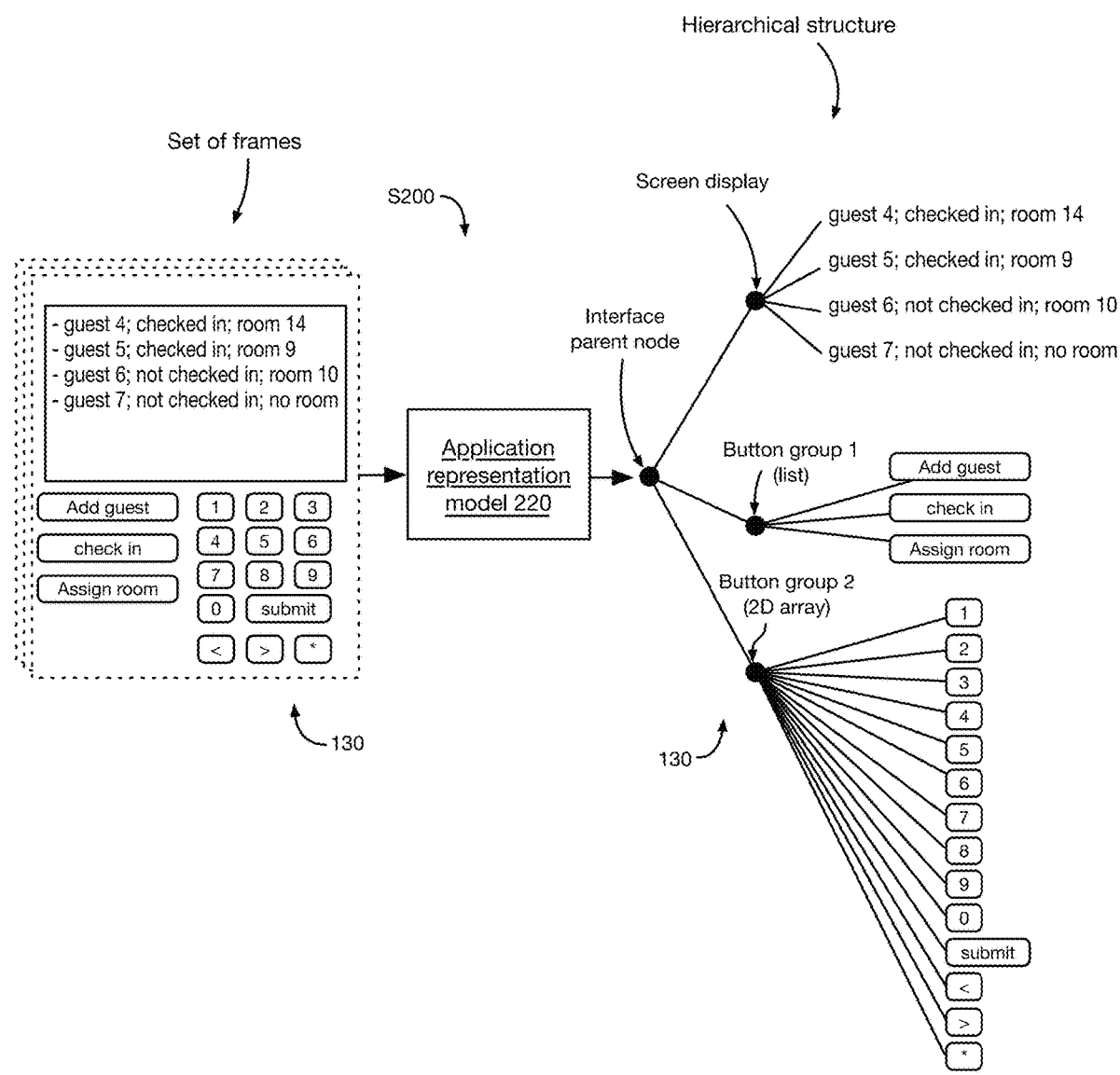
FIG. 10 is an illustrative example of a variant of determining an application representation.

S200 can be performed one or multiple times in a row, optionally using the prior iteration's output as an input for each iteration. In a first variant, the application representation 130 is captured via screen recording during a first iteration and the screen recording is parsed to generate a hierarchy of segmented elements (e.g., element representations) during a second iteration (e.g., example shown in FIG. 10). In a second variant, multiple DOMs are received from webpages within the computing environment, and the hierarchical information within each webpage is combined into one hierarchical structure. In a third variant, based on a received DOM (e.g., received during a first iteration of S200), a backend hierarchy is inferred during a second iteration of S200, and a hierarchical structure is generated. In a fourth variant, an AST is generated by compiling or interpreting received application source code. However, iterations of S200 can otherwise be strung together.

However, determining an application representation 130 of an application S200 can be otherwise performed.

Generating a set of tasks based on the automation request S300 can function to determine an intermediary set of tasks 120 that collectively describe the workflow. S300 can preferably be performed by the task model 210 running on a different same computing system as the computing system which runs the computing environment 10 but can alternatively run on the same computing system. S300 can preferably be performed after S100 and before 500, but S300 can alternatively be performed at any other suitable time. S300 can be performed responsive to any suitable condition. In a first variant, S300 can be performed when the automation request 110 is received and/or updated. In a second variant, S300 can be performed when the application representation 130 is updated. Alternatively, S300 performance can be independent of S200 and/or application representations 130. In a third variant, S300 can be performed when the computing environment interface is updated. In a fourth variant, S300 can be performed responsive to a failure and/or error (e.g., of determining a set of tasks 120, determining a set of instructions 35, executing the set of instructions 35, etc.). Alternatively, S300 is not performed responsive to an instruction set or RPA failure. However, S300 can be performed at any other suitable time. The system can generate each task 120 one at a time but can alternatively generate multiple tasks 120 at the same time (e.g., generate all tasks 120 concurrently). In an example, the task model 210 generates a set of tasks from the automation request 110 and then recursively generates subsets of tasks 120 for each task in the process. In a second example, the task model 210 generates one task at a time. In a first specific example, the system uses a previously-generated task 120 to inform the generation of the subsequent task 120. In a second specific example, the system uses a different task model 210 for successive tasks 120 (e.g., performing a task model determination step between tasks 120). The task model can be selected based on the task classification, the prior task, the application state after prior task performance, and/or otherwise selected.

In a first variant, the task model 210 generates one task 120 for the automation request 110. In a second variant, the task model 210 generates one set of multiple tasks 120 (e.g., an ordered or unordered set). In a third variant, the task model 210 generates one set of multiple tasks 120 and a set of logical and/or temporal relationships between them. In a fourth variant, the task model 210 generates multiple sets of tasks 120, each for use in a different application 20 and/or computing environment 10. In a first example, the set of tasks 120 includes multiple alternative task paths which accomplish the same goal. In a second example, the set of tasks 120 includes multiple alternative orderings of tasks 120. In a third example, the set of tasks includes a single ordered list of tasks with no conditionals. However, any other suitable type of task set can be determined.

S300 can be performed without information about the computing environment 10 (e.g., no a priori knowledge) but S300 can alternatively be performed using information about the computing environment 10 and/or application 20. In a specific example, the system can use information about the computing environment 10 and/or application 20 for some tasks 120 and not others. The information about the computing environment 10 and/or application 20 can be an application representation 130 or other suitable information. The task model 210 can evaluate (e.g., with or without the validation model 250) and regenerate the set of tasks 120 at any suitable time.

In variants, the method can include selecting a task model 210 for a particular automation request type (e.g., data type), task 120, application 20, computing environment 10, objective, complexity level, and/or otherwise selecting the task model 210.

Alternatively or additionally, S200 can include receiving tasks 120 from the user. In a first variant, the tasks 120 are displayed to the user, who edits the tasks 120. In a second variant, the tasks 120 are directly input by the user. In a third variant, the tasks 120 are generated by the task model 210 based on user-provided information via a chatbot conversation or a questionnaire.

However, S300 can be otherwise performed.

The method can optionally include classifying each task in the set of tasks S400 can function to determine a class for each task 120 to inform the generation of a set of instructions 35 for the task 120. The task class can be used to select a task class-specific instruction model 240 for task instruction generation, or be otherwise used. S400 can preferably be performed by the classification model 230 running on a different computing system from that running the computing environment 10, but can alternatively be performed on the same computing system. S400 can be performed after S300 and before S500, but can alternatively be performed at any suitable time. In a first variant, S400 is performed when the set of tasks 120 is determined and/or updated. In a second variant, S400 is performed when the system determines that the set of instructions 35 should be determined and/or redetermined (e.g., before S500). In a third variant, S400 can be performed when the application representation 130 is updated. However, S400 can be performed at any other time. However, S400 can be alternatively performed.

Generating a set of instructions for each task in the set of tasks S500 can function to translate tasks 120 into machine-readable instructions (e.g., code snippets). S500 can be performed by the instruction model 240, remediation model 260, and/or any other suitable set of models (e.g., example shown in FIG. 6B). The instruction model and/or remediation model can run on a different computing system from that running the computing environment 10, but can alternatively be performed on the same computing system. S500 can be performed after S300, but alternatively can be performed at any other time.

In a first variant, S500 is performed when the automation request 110 is received. In a second variant, S500 is performed each time the computing environment 10 and/or application is updated. In a third variant, S500 is performed when the application representation 130 is received and/or updated. In a fourth variant, S500 is performed when a task list is generated or updated (e.g., determined for the entire task list, for the new tasks in the task list, etc.). In a fifth variant, S500 is performed periodically (e.g., when a better instruction model 240 is released). In a sixth variant, S500 is performed when the RPA bot 30 encounters an error. For example, S500 can be run using the instruction model and optionally an updated application representation to regenerate the instruction sets for the task set. In another example, S500 can be run using the remediation model and optionally an updated application representation to generate additional remediation code to insert into the RPA bot (e.g., set of instruction sets). In a seventh variant, S500 is performed when the instruction set performs a different task from a desired task 120. In an eighth variant, S500 is performed when the classification of tasks within the set of tasks 120 is determined and/or updated. In a ninth variant, S500 is performed when the output of a previous iteration of S500 is not validated (e.g., fails in S600). In a tenth variant, S500 is performed when a time threshold is reached (e.g., in a variant where S500 is determined at a predetermined time interval). However, S500 can be performed at any other suitable time.

The set of instructions 35 is preferably generated without redetermining the set of tasks 120, but can alternatively be generated using a new set of tasks 120. The set of instructions 35 can be generated for one task 120, or for multiple tasks 120. The set of instructions 35 can be based on a single task, a subset of previous instructions and/or tasks 120 (e.g., prior task, prior two tasks, etc.), based on all prior instructions and/or tasks 120, based on all tasks 120, and/or based on no prior instructions and/or tasks 120. The set of instructions 35 is preferably generated using one or more application representations, more preferably the application representation for the application that the task is interacting with, but can additionally or alternatively be generated based on any other suitable information.

The set of instructions 35 can be generated manually or automatically. The set of instructions 35 can be tested, evaluated, and regenerated at any suitable time using the RPA bot 30, instruction model 240, computing environment 10, remediation model 260, and/or any other suitable system components.

In variants, S500 can include an additional element filtering step, wherein element representations which fit a removal criteria are filtered out of the application representation 130. The removal criteria can be whether an element is non-interactable, whether the element has a low likelihood of performing a function relevant to the task 120, whether the element is used infrequently, whether a semantic classification of the element does not meet a selection criteria (e.g., filtering out elements which quit the application 20).

S500 can include using a task element (e.g., a semantic descriptor) to identify an interaction element based on the application representation 130 and/or any other suitable information. In an example, the application representation includes a set of element representations (e.g., segments) of a frame (e.g., of a video; extracted from the request or from another description of the application), wherein each task 120 includes a target element representation (e.g., segment extracted from the request, semantic description of the element, encoding, etc.). In this example, S500 can include identifying an element within the application representation that corresponds to the target element (e.g., using a distance metric, matching model, etc. on the respective element representations), and generating code to perform the task's action on the identified element.

In another example, S500 can include an element representation aggregation step, wherein candidate element representations are selected from the application representation 130 based on a comparison of the task 120 and information about the element represented by the element representation. The set of instructions 35 can be based on a selection of element representations from the candidate element representations. Candidate element representations can be the elements themselves but can alternatively be an element representation and/or an element identifier (e.g., an index number, a title, etc.).

However, S500 can otherwise use the application representation.

S500 can generate the instructions using: generative models (e.g., trained on task-code pairs; trained on task-application representation-code sets; etc.); a ruleset (e.g., a specific set of code for a given task type); and/or otherwise generate the instructions.

In a first variant, S500 can include parsing a hierarchy (e.g., a DOM) to identify interaction elements and a type of corresponding action (e.g., using element intent; from the task; etc.) and generating instructions 35 to perform the action on the interaction element (e.g., using playwright, using a trained instruction model, etc.). Identifying interaction elements can include using an interaction ID, using the element code, and/or using any other information. Examples of types of actions include "click," "scroll," "type," and/or any other suitable action type. Actions can additionally include action values (e.g., scroll valence, how far to scroll, what to type) which can be determined from the automation request 110 or from an adjacent task's instructions 35.

In a second variant, S500 can include using computer vision-based methods (e.g., when a hierarchy does not exist or cannot be used, as an alternative to using the hierarchy, etc.). In a first example of this variant, a VLM or other machine learning architecture can be used to identify the visual position (e.g., x, y, optionally z), determine an action to be performed at that location (e.g., from the task description), and generate instructions 35 to perform the action at the visual position. In a second example of this variant, a VLM can be used to identify an element representation within the current application representation 130 (e.g., a runtime application frame) and generate instructions 35 to perform the action on the identified element (e.g., at the identified element's position). In a first embodiment, the element representation can be identified by matching an element segment associated with the task 120 to a segment of the current application representation 130 (e.g., using element encodings, wherein the element encodings of the current application representation 130 can be determined by segmenting and encoding the current application representation 130 to extract element encodings; using traditional computer vision feature matching, such as edge or blob matching; etc.). In a second embodiment, the element representation can be identified by matching an encoding associated with the task 120 to an element representation within the current application representation 130 with a similar encoding (e.g., wherein the encodings of element representations within the current application representation 130 can be determined by segmenting the current application representation 130 to extract element segments, then encoding the element segments using a shared encoder). In a third embodiment, the element representation can be identified by interacting with the application 20 until a response associated with the task occurs, wherein the element that generated the response is identified as the target element. In a fourth embodiment, the element representation can be identified by semantically segmenting or detecting element representations associated with the task 120 on the current application representation 130, then generating code to perform the task 120 on the semantic segments or detected elements (e.g., with the position of the semantic segments or detected elements). In a fifth embodiment, S500 can include identifying an interaction element within the application representation (e.g., semantic segment, labeled object, etc.) that is associated with a task's semantic description of an interaction element. However, the element representation can be otherwise identified.

In a third variant, S500 can include segmenting a series of recorded application interactions based on the respective task 120 (e.g., temporally), wherein the sub-series of recorded application interactions (e.g., interaction segment) functions as an element representation and/or value for the respective task 120. In embodiments, interaction instance-specific values (e.g., usernames, passwords, etc.) can be identified and abstracted out using a variable; alternatively, interaction instance-specific values can be left within the instruction.

In a fourth variant, S500 can include using an API call requesting a set of instructions 35. In this example, generation of the set of instructions 35 occurs remotely from the computing system which determines tasks 120 and/or operates the RPA bot 30 (e.g., example of an interface with the remote instruction generation system shown in FIG. 12C, FIG. 12D, FIG. 12E, FIG. 12F, and FIG. 12G). In this variant, the received set of instructions 35 can be amended (e.g., by the instruction model 240 and/or remediation model 260) or can be used directly.

In a fifth variant, S500 can include iteratively remediating prior instruction execution failures until the task 120 is accomplished (e.g., "guess-and-check"). In this variant, a set of instructions 35 for a particular task 120 are executed, and responsive failure to accomplish the particular task, the set of instructions 35 are remediated (e.g., iteratively attempting different remediation model 260 (s) and re-executing the remediated set of instructions 35 until the task 120 is accomplished). In this variant, the application representation 130 can be updated after each determined set of instructions 35 is executed and/or before the next set of instructions 35 is determined (e.g., based on the updated application representation 130). When the task 120 is accomplished, the remediated set of instructions 35 are added to the set of instructions before executing the set of instructions 35 and determining the next task 120.

However, S500 can include any combination of the aforementioned variants and/or any other suitable methods.

Optionally validating the set of instructions S600 can function to evaluate the set of instructions 35 determined in S500. In variants, the method can validate the set of instructions 35 for each task 120, all sets of instructions 35 for all tasks 120 in the set of tasks (e.g., the RPA bot 30 as a whole), each individual instruction, and/or any other suitable set of instructions 35. S600 can occur before or after S300, S200, S400, S600, S700, and/or at any other suitable time. In a first variant, S600 is performed whenever the set of instructions 35 is determined and/or updated. In a second variant, S600 is performed whenever the application representation 130 is determined and/or updated. In a third variant, S600 is performed when the application 20 and/or computing environment is updated. In a fourth variant, S600 is performed at a predetermined frequency. In a fifth variant, S600 is performed during execution of the RPA bot's instructions 35 (e.g., at every iteration, after every X iterations, responsive to an error event, etc.). In a sixth variant, S600 is performed when a set of instructions 35 does not compile. In a seventh variant, S600 is performed iteratively with determination of updated sets of instructions 35 as part of an iterative variant of S500. However, S600 can occur at any other suitable time.

S600 can performed by a validation model 250 running on the same or different computing system as the computing system which runs the RPA bot 30; by the application; by the computing environment; and/or by any other suitable system.

In variants, S600 can include receiving diagnostic information. In a first variant, diagnostic information is a post-execution computing environment state to compare with a stored pre-execution computing environment state. The computing environment state can include an application representation 130, DOM, screenshot, other hierarchical information, and/or any other suitable type of information. In a second variant, diagnostic information can include an error message (e.g., generated by the application). In a third variant, diagnostic information can include the set of instructions 35. In a fourth variant, diagnostic information can include the output of an application 20 running within the computing environment 10. In a fifth variant, diagnostic information can include an encoding of any of the aforementioned variants (e.g., an encoding of an error message). In a sixth variant, diagnostic information can be a combination of any of the aforementioned variants. However, the diagnostic information can be otherwise configured and/or determined.

In a first variant, the set of instructions 35 can be validated automatically. In this variant, S600 can use the validation model 250 to determine if the task 120 was accomplished based on pre-execution computing environment state and a post-execution computing environment state (e.g., whether the state has changed, whether a classification of the state change is a target class associated with the task, etc.). The computing environment states can be screenshots, application representations 130, and/or any other suitable information about the computing environment 10. To determine whether the task 120 was accomplished, the validation model 250 can determine whether the computing environment state changed in the expected manner, whether the state change conceptually matches the task 120 and/or automation request 110 (e.g., comparing an encoding of the state change to an encoding of the task 120, etc.), using the post-execution computing environment 10 to infer what task was actually performed (e.g., using a classifier, etc.) and determine task completion by comparing the inferred task to the task 120, by comparing a post-execution computing environment 10 to an expected post-execution computing environment 10, and/or any other mechanism by which task 120 completion can be evaluated.

In a second variant, the set of instructions 35 can be validated manually (e.g., a user can input whether the set of instructions 35 and/or an output corresponding to the set of instructions 35 are correct or incorrect).

However, the instructions 35 can be validated by any other suitable means.

Instructions 35 can be validated in any order. In a first variant, the entire set of instructions 35 is validated at once (e.g., concurrently). In a second variant, a subset of instructions (e.g., instructions corresponding to a task or set of tasks) is validated together. In a third variant, each instruction within the set of instructions 35 is validated individually. However, validation of a set of instructions can be otherwise performed.

In variants, when the set of instructions 35 are determined to be invalid (e.g., incorrect, don't compile, don't accomplish the desired task 120, generate an error, etc.), then: the instruction set or task can be evaluated via an affordance function, any step between S100 and S500 can be re-run, S600 (instruction set validation) can be performed, S500 (instruction set remediation) can be performed, the set of instructions 35 can be manually edited by a user, the set of tasks 120 can be automatically edited and/or manually edited by a user, and/or any other instruction amendment step can be performed.

However, S600 can include any other suitable methods.

In variants, the method can optionally include remediating the RPA bot, which functions to accommodate for changes in the application and/or computing environment. The RPA bot can be remediated: when a runtime error occurs, when an instruction set is invalid, and/or when any other suitable condition is met. The RPA bot can be remediated: during runtime (e.g., in real-time, during S700, etc.), after runtime (e.g., after S700), before runtime, and/or at any other time. The RPA bot can be remediated using the remediation model, manually remediated, and/or otherwise remediated.

In a first variation, remediating the RPA bot can include: determining an updated application representation of the application (or set thereof); generating a new instruction set for the task based on the task and the updated application representation; and replacing the old instruction set for the task with the new instruction set in the RPA bot.

In a second variation, remediating the RPA bot can include: executing a remediation option (e.g., remediation instruction, remediation code, remediation modules, etc.) from a set of remediation options; re-executing the instruction set for the failed task (e.g., the last task before the error was thrown); repeating the remediation using another remediation option from the set when the instruction set execution fails (e.g., determined using S600); and adding the remediation option (e.g., the code) to the RPA bot before the instruction set for the task when the instruction set execution succeeds. This variation can optionally include reverting the remediation before repeating remediation with another remediation option, wherein each remediation option can be associated with a set of reversion instructions. Alternatively, the remediation can not be reverted. In this embodiment, the entire set of attempted remediation options can be added to the RPA bot, or only the successful remediation option can be added to the RPA bot.

In a third variation, remediating the RPA bot can include: determining an actual pre-execution application state (e.g., a screenshot of the application before task instruction set execution); determining a target pre-execution application state (e.g., a screenshot of an expected application state, from the automation request); determining a difference between the actual and target pre-execution application states (e.g., using a classifier, CLIP model, LLM, etc.); and generating remediation instructions to achieve the target pre-execution application state using the instruction model (or another model), the application representation, and the difference. The remediation instructions can be inserted into the RPA bot before the task instruction set, or be otherwise used.

However, the RPA bot can be otherwise remediated.

Executing the set of instructions S700 can function to operate the RPA bot 30 (e.g., example shown in). S700 can be performed by any suitable computing system. In a first variant, S700 is performed on the same computing system as determining the set of instructions 35. In a second variant, the set of instructions 35 are sent to and run on another entity (e.g., an application 20, remote system, etc.). In a third variant, S700 includes creating a virtualized environment and operating the RPA bot 30 within the virtualized environment. In an example of this variant, the virtualized environment can include a copy of a particular computing environment 10 remote to the system component performing S700. In a fourth variant, S700 includes remoting into the computing environment 10 (e.g., remote controlling the computing environment 10). In this variant, computing environment state changes and/or results can be captured and sent to the remote computing system for instruction set analysis and subsequent instruction set execution. Executing the set of instructions S700 can include running code within the set of instructions 35, publishing the set of instructions 35 (e.g., making the instructions available for a user to download or access via an API call), or otherwise executing the set of instructions 35. However, S700 can include any other suitable methods.

All references cited herein are incorporated by reference in their entirety, except to the extent that the incorporated material is inconsistent with the express disclosure herein, in which case the language in this disclosure controls.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The set of instructions 35 can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions 35 can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications 20 mentioned above, each of which are incorporated in their entirety by this reference.

However, the method can be otherwise performed.

As a person skilled in the art will recognize from the previous detailed description and from the figures and claims, modifications and changes can be made to the preferred embodiments of the invention without departing from the scope of this invention defined in the following claims.

We claim:

1. A method for robotic process automation (RPA), comprising:
    receiving an automation request comprising an interaction description of a user interaction with a set of applications;
    using a task model, determining a list of tasks based on the interaction description, wherein each task is associated with an application of the set of applications;
    determining an application representation for each of the set of applications, wherein each application representation represents a set of interaction elements of the respective application; and
    determining an RPA bot, comprising:
        for each task in the list of tasks, determining a set of code using an instruction model based on the task and the application representation for the respective application, wherein the sets of code cooperatively form the RPA bot;
        executing the set of code;
        after executing the set of code, redetermining the application representation; and
        determining a second set of code for a subsequent task based on the redetermined application representation.

2. The method of claim 1, further comprising, for each task in the list of tasks:
    executing the set of code from the RPA bot;
    after redetermining the application representation, analyzing the redetermined application representation to determine whether the task was completed; and
    when the task was not completed, redetermining the set of code based on the task and the redetermined application representation.

3. The method of claim 1, further comprising:
    after determination that an application of the set of applications has been updated, determining an updated application representation of the application; and
    without redetermining the list of tasks, redetermining the set of code for each task associated with the application.

4. The method of claim 1, wherein each task comprises an action and a target element.

5. The method of claim 4, wherein the target element comprises a semantic descriptor of an interaction element within the application, wherein the instruction model identifies the corresponding interaction element within the application representation based on the semantic descriptor when determining the set of code for the task.

6. The method of claim 1, wherein the list of tasks is determined without using the application representation.

7. The method of claim 1, wherein the interaction description comprises a screen recording.

8. The method of claim 7, wherein determining the list of tasks further comprises: for each task, determining an image segment depicting an interaction element associated with the task from the screen recording.

9. The method of claim 1, wherein the application representation comprises a frame, wherein determining the set of code comprises:
   determining a set of visual segments of the frame; and
   determining the set of code based on the set of visual segments.

10. The method of claim 1, wherein the application representation comprises an HTML document object model (DOM).

11. A computing system, comprising:
   a storage device; and
   a processing system coupled to the storage device, the storage device storing software instructions for controlling the processor that, when executed, configure the processor to:
      run a set of applications;
      determine a user workflow performed using the set of applications;
      determine a set of tasks for robotic process automation (RPA) using a task model based on the user workflow;
      using an instruction model, for a task within the set of tasks, determine a set of RPA instructions based on the task and a set of representations for the set of applications; and
      interact with the set of applications by executing the sets of RPA instructions;
      during execution of the sets of RPA instructions:
         in response to detecting failure of a set of RPA instructions associated with a task from the set of tasks, iteratively:
            executing a remediation code set from a predetermined set of remediation code sets; and
            executing the set of RPA instructions;
         until the set of RPA instructions succeeds;
         wherein the remediation code set associated with successful execution is added to the sets of RPA instructions.

12. The computing system of claim 11, wherein the set of RPA instructions are determined based on a classification of the task.

13. The computing system of claim 12, wherein classifying the task comprises classifying the task as an API call based on the set of representations.

14. The computing system of claim 11, wherein the set of tasks is further determined based on the set of representations.

15. The computing system of claim 11, wherein the user workflow is determined from a set of responses to a questionnaire.

16. The computing system of claim 11, wherein the user workflow comprises a set of frames depicting a desktop computing environment, wherein the set of representations represent applications executing on the desktop computing environment.

17. The computing system of claim 11, wherein the set of representations comprise a set of semantic segments of a set of visual representations of the set of applications, wherein the set of RPA instructions are determined based on the set of semantic segments.

18. A computing system, comprising:
   a storage device; and
   a processing system coupled to the storage device, the storage device storing software instructions for controlling the processor that, when executed, configure the processor to:
      run a set of applications;
      determine a user workflow performed using the set of applications;
      determine a set of tasks for robotic process automation (RPA) using a task model based on the user workflow;
      using an instruction model, for a task within the set of tasks, determine a set of RPA instructions based on the task and a set of representations for the set of applications; and
      interact with the set of applications by executing the sets of RPA instructions; wherein at least one of the sets of RPA instructions comprise pixel coordinates and wherein the method further comprises, during execution of the sets of RPA instructions:
         updating the pixel coordinates in response to detecting failure of a task from the set of tasks.

* * * * *